US011872824B2

(12) United States Patent
Mizuno

(10) Patent No.: US 11,872,824 B2
(45) Date of Patent: Jan. 16, 2024

(54) PRINTED MATTER FORMING METHOD AND PRINTED MATTER FORMING SYSTEM

(71) Applicant: FUJIFILM Corporation, Tokyo (JP)

(72) Inventor: Tomohiro Mizuno, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 337 days.

(21) Appl. No.: 17/469,891

(22) Filed: Sep. 9, 2021

(65) Prior Publication Data

US 2021/0402796 A1 Dec. 30, 2021

Related U.S. Application Data

(63) Continuation of application No. PCT/JP2020/002712, filed on Jan. 27, 2020.

(30) Foreign Application Priority Data

Mar. 18, 2019 (JP) ................................. 2019-049974

(51) Int. Cl.
*B41J 2/21* (2006.01)
*B41J 2/525* (2006.01)
*B41M 5/52* (2006.01)

(52) U.S. Cl.
CPC ........... *B41J 2/2114* (2013.01); *B41J 2/2132* (2013.01); *B41J 2/525* (2013.01); *B41M 5/52* (2013.01)

(58) Field of Classification Search
CPC ........ B41J 2/2114; B41J 2/2132; B41J 2/525; B41J 2/01; B41J 2/2117; B41M 5/52; B41M 3/06
See application file for complete search history.

(56) References Cited

U.S. PATENT DOCUMENTS 9,109,955 B2 8/2015 Horita
9,871,950 B2 * 1/2018 Arai ......................... H04N 1/50
(Continued)

FOREIGN PATENT DOCUMENTS

JP 2011061723 3/2011
JP 2016196103 11/2016
(Continued)

OTHER PUBLICATIONS

Hotta Shuhei; Color Information Processing Method, Device, and Program; Sep. 4, 2014; Japan, All Pages (Year: 2014).*
(Continued)

*Primary Examiner* — Justin Seo
*Assistant Examiner* — Tracey M McMillion
(74) *Attorney, Agent, or Firm* — JCIPRNET

(57) ABSTRACT

Provided are a printed matter forming method and a printed matter forming system for forming a printed matter in which the texture of the surface of a target object is satisfactorily reproduced.
In the printed matter forming method and the printed matter forming system according to embodiments of the present invention, a printed matter is formed by forming a printing layer on the surface of the internal scattering member in order to reproduce the texture of the surface of the target object. Further, in the present invention, the first light scattering characteristic data about the light scattering characteristic with respect to the incident light on the surface of the target object, the second light scattering characteristic data for each type of fluid relating to the light scattering characteristic of the fluid constituting the printing layer, and the third light scattering characteristic data about the light scattering characteristic of the internal scattering member are acquired. Further, in the present invention, the light scattering characteristic of the printed matter corresponding
(Continued)

to the formation condition of the printing layer is estimated based on the second light scattering characteristic data and the third light scattering characteristic data for each type, and the printing layer is formed on the surface of the internal scattering member in accordance with the formation condition which is set based on the estimated light scattering characteristics of the printed matter and the first light scattering characteristic data.

20 Claims, 11 Drawing Sheets

(56) References Cited

U.S. PATENT DOCUMENTS

| | | | |
|---|---|---|---|
| 2011/0063618 | A1 | 3/2011 | Horita |
| 2016/0286069 | A1 | 9/2016 | Kubo et al. |
| 2018/0117849 | A1 | 5/2018 | Brunton et al. |
| 2019/0094141 | A1 | 3/2019 | Suzuki et al. |

FOREIGN PATENT DOCUMENTS

| | | |
|---|---|---|
| JP | 2017017589 | 1/2017 |
| JP | 2017208703 | 11/2017 |
| JP | 2018012242 | 1/2018 |

OTHER PUBLICATIONS

Horita Shuhei; Predicting Color Reproduction Of A Protective-film-covered Print; Mar. 30, 2011; Europe, All Pages (Year: 2011).*

"International Search Report (Form PCT/ISA/210) of PCT/JP2020/002712," dated Apr. 7, 2020, with English translation thereof, pp. 1-5.

"Written Opinion of the International Searching Authority (Form PCT/ISA/237)" of PCT/JP2020/002712, dated Apr. 7, 2020, with English translation thereof, pp. 1-6.

* cited by examiner

PRINTED MATTER FORMING METHOD AND PRINTED MATTER FORMING SYSTEM

CROSS-REFERENCE TO RELATED APPLICATIONS

This application is a Continuation of PCT International Application No. PCT/JP2020/002712 filed on Jan. 27, 2020, which claims priority under 35 U.S.C. § 119(a) to Japanese Patent Application No. 2019-049974 filed on Mar. 18, 2019. Each of the above applications is hereby expressly incorporated by reference, in its entirety, into the present application.

BACKGROUND OF THE INVENTION

1. Field of the Invention

The present invention relates to a printed matter forming method and a printed matter forming system. In particular, the present invention relates to a printed matter forming method and a printed matter forming system capable of forming a printed matter in which the texture of the surface of a target object is reproduced.

2. Description of the Related Art

In various fields using printing technology, it is necessary to accurately reproduce the texture of a reproduction target object (hereinafter, simply referred to as "target object") through printing. Here, the texture of the target object means the optical characteristics that the target object exhibits on its surface. Specifically, the optical characteristics corresponds to the internal scattering characteristics of light, the depth of the transparent part that is exposed on the surface of the target object (in other words, the thickness of the transparent part), and the like. Techniques for reproducing the optical texture of a target object have been developed so far, and examples thereof include the techniques described in JP2018-12242A and JP2016-196103A.

The invention described in JP2018-12242A is a technique relating to an image forming device that suitably reproduces the appearance of subsurface scattering of a translucent body. The image forming device described in JP2018-12242A acquires light scattering characteristic data indicating light scattering characteristic inside a target object for each of a plurality of lights having different wavelengths, determines the laminated structure of the scattering layer and the coloring material layer, based on the acquired light scattering characteristic data, and forms the scattering layer and the coloring material layer, based on the determined laminated structure.

Specifically, in the image forming device described in JP2018-12242A, the scattering layer in the laminated structure is formed of white ink and clear ink, and the coloring material layer is formed of a coloring material (specifically, color ink). Then, in the image forming device described in JP2018-12242A, the amount and distribution of each ink used are determined based on the acquired light scattering characteristic data, and the scattering layer and the coloring material layer are formed in accordance with the determined contents.

The invention described in JP2016-196103A is a technique relating to an image forming device capable of adjusting the image quality of a printed matter based on the physical characteristics of a target object. The image forming device described in JP2016-196103A creates image quality adjustment information for adjusting the image quality of a printed matter in a case of printing image data. Further, the image forming device described in JP2016-196103A acquires physical information indicating the physical characteristics of the target object and converts the acquired physical information into image quality adjustment information. Specifically, the image forming device described in JP2016-196103A acquires internal scattering characteristic information as physical information, and converts the physical information into image quality adjustment information for adjusting the glossiness, graininess, transparency, and the like of the printed matter.

SUMMARY OF THE INVENTION

In the image forming device described in JP2018-12242A, as described above, the formation condition of the scattering layer and the coloring material layer are determined based on the acquired data about the light scattering characteristic of the target object. More specifically, the image forming device described in JP2018-12242A stores the correspondence relationship between the light scattering characteristic and the amount and distribution of various inks as data such as a look-up table (LUT), and determines the condition (specifically, the amount of each ink used, and the like) corresponding to the light scattering characteristic with reference to the LUT.

Similarly, in the image forming device described in JP2016-196103A, in a case where converting the acquired physical information into image quality adjustment information, an image quality adjustment condition corresponding to the physical information is set with reference to the LUT, and the adjustment items of the printing layer (specifically, the transparency, the graininess, the type of the coloring material deposited on the outermost surface, and the like) are adjusted in accordance with the set condition.

On the other hand, the light scattering characteristic of the finally obtained printed matter are affected by the combination of materials (for example, ink used) constituting each layer of the printing layer (laminated structure in JP2018-12242A), the thickness of each layer, and the like, and also depends on the optical properties of the substrate on which the printing layer is formed. In particular, in a case where an internal scattering member (the internal scattering member will be described later) is used as the substrate, the light scattering characteristic of the printed matter largely depend on the characteristics of the internal scattering member.

Therefore, in order to reproduce the texture of the target object satisfactorily, it is necessary to perform the following processing. The characteristics of the final printed matter are predicted from the characteristics of the substrate and the printing layer formed on the substrate, and the printing layer is formed in accordance with the prediction result. However, in the above-mentioned JP2018-12242A and JP2016-196103A, only the condition corresponding to the scattering characteristic of the target object are derived from the LUT, and the characteristic of the final printed matter are not reflected in the formation condition of the printing layer.

Therefore, the present invention has been made in view of the above circumstances to achieve the following object.

Specifically, in order to solve the above-mentioned problems of the prior art, an object of the present invention is to provide a printed matter forming method and a printed matter forming system capable of forming a printed matter that more accurately reproduces the texture of a target object.

According to an aspect of the present invention, in order to achieve the above object, there is provided a printed matter forming method of forming a printed matter by forming a printing layer on a surface of an internal scattering member in order to reproduce a texture of a surface of a target object. The printed matter forming method comprises: acquiring first light scattering characteristic data about a light scattering characteristic of the target object with respect to incident light on the surface of the target object; acquiring second light scattering characteristic data about a light scattering characteristic of a fluid constituting the printing layer, for each type of the fluid; acquiring third light scattering characteristic data about a light scattering characteristic of the internal scattering member; estimating a light scattering characteristic of the printed matter according to a formation condition of the printing layer, based on the second light scattering characteristic data for each type of the fluid and the third light scattering characteristic data; setting the formation condition employed at the time of forming the printing layer, based on the estimated light scattering characteristic of the printed matter and the first light scattering characteristic data; and forming the printing layer on the surface of the internal scattering member in accordance with the set formation condition.

In the printed matter forming method according to the aspect of the present invention, the light scattering characteristic of the final printed matter are estimated from the light scattering characteristic of the substrate and the printing layer formed on the substrate. Then, the printing layer is formed in accordance with the formation condition which is set in accordance with the estimated light scattering characteristic and the light scattering characteristic on the surface of the target object. Thereby, the printing layer can be formed so as to satisfactorily reproduce the texture of the surface of the target object based on the light scattering characteristic of the entire printed matter.

Further, in the above-mentioned printed matter forming method, it is suitable that in a case of acquiring the second light scattering characteristic data for each type of the fluid, a density of dots formed by landing of the fluid is changed, and the second light scattering characteristic data is acquired for each density; and in a case of estimating the light scattering characteristic of the printing layer, the light scattering characteristic of the printed matter is estimated, based on the second light scattering characteristic data and the third light scattering characteristic data for each type of the fluid acquired for each density.

According to the above configuration, the second light scattering characteristic data is acquired by changing the density of dots for each type of fluid. Therefore, in a case of estimating the light scattering characteristic of the printed matter based on the second light scattering characteristic data, it is possible to estimate the light scattering characteristic by changing the density of dots.

Further, in the above-mentioned printed matter forming method, it is suitable that the formation condition includes a condition relating to at least one of the number of layers of the printing layer, a thickness of the layer, a type of the fluid constituting the layer, or the density of the dots in the layer.

According to the above configuration, the formation condition of the printing layer, condition that can affect the light scattering characteristic can be set. As a result, the light scattering characteristic of the final printed matter can be appropriately adjusted.

Further, in the above-mentioned printed matter forming method, it is suitable that in a case of setting the formation condition employed at the time of forming the printing layer, a formation area of the printing layer on the surface of the internal scattering member is divided into a plurality of unit regions, and the formation condition employed at the time of forming the printing layer is set for each unit region; and in a case of forming the printing layer, each part of the printing layer is formed in accordance with the formation condition which is set for the unit region corresponding to each part.

According to the above configuration, the formation condition is set for each unit region, and each part of the printing layer is formed in accordance with the formation condition which is set for the unit region corresponding to each part. Therefore, it is possible to adjust the texture of each part of the printing layer like the image (image-wise).

Further, in the above-mentioned printed matter forming method, it is suitable that thickness data about a thickness of a transparent part exposed on the surface of the target object is further acquired; and in a case of setting the formation condition employed at the time of forming the printing layer, the formation condition is set based on the estimated light scattering characteristic of the printed matter, the thickness data, and the first light scattering characteristic data.

According to the above configuration, since the formation condition of the printing layer is set based on the thickness data, it is possible to reproduce the light scattering characteristic and the thickness of the transparent part as the texture of the surface of the target object.

Further, in the above-mentioned printed matter forming method, it is suitable that in a case of forming the printing layer, the printing layer having a transparent layer composed of a transparent fluid in a part corresponding to the transparent part is formed.

According to the above configuration, by forming the transparent layer at a position corresponding to the transparent part on the surface of the target object in the printing layer, the sense of depth of the transparent part is reproduced.

Further, in the above-mentioned printed matter forming method, it is suitable that in a case of forming the printing layer having a multilayer structure in at least a part thereof, the printing layer having a white layer composed of a white fluid in the multilayer structure is formed.

According to the above configuration, by forming a white layer on a part of the printing layer having a multilayer structure, it is possible to appropriately adjust the light scattering characteristic of the corresponding part.

Further, in the above-mentioned printed matter forming method, it is suitable that in a case of forming the printing layer having a multilayer structure in the part corresponding to the transparent part, the printing layer in which the white layer is disposed between the transparent layer and the internal scattering member in the multilayer structure is formed.

According to the above configuration, in the printing layer, the white layer is formed between the transparent layer and the internal scattering member in the part corresponding to the transparent part of the target object. Therefore, it is possible to reproduce the light scattering characteristic of the part located directly below the transparent part in the target object.

Further, in the above-mentioned printed matter forming method, it is suitable that in a case of forming the printing layer having a multilayer structure in the part corresponding to the transparent part, the printing layer having the transparent layer and a color layer disposed adjacent to the transparent layer between the transparent layer and the internal scattering member in the part corresponding to the transparent part is formed.

According to the above configuration, since the color layer is formed directly under the transparent layer, it is possible to better reproduce the sense of depth of the transparent part on the surface of the target object.

Further, in the above-mentioned printed matter forming method, it is suitable that in a case of forming the printing layer having the multilayer structure in at least a part thereof, the printing layer having the white layer and a color layer disposed on an opposite side of the internal scattering member with the white layer interposed therebetween in the part of the multilayer structure is formed.

According to the above configuration, the color layer is formed on the white layer in the part of the multilayer structure in the printing layer. Therefore, for example, in a case where the light incident on the multilayer structure is reflected at a position separated from the incidence position through internal scattering, it is possible to reproduce a light scattering characteristic in which the distance between the incidence position and the reflection position is not so large.

Further, in the above-mentioned printed matter forming method, it is suitable that in a case of forming the printing layer having the color layer in a part of the multilayer structure, the printing layer, in which a low brightness layer disposed adjacent to the color layer between the color layer and the internal scattering member is provided in a part of the multilayer structure, is formed, and the low brightness layer is a layer having a color of which a brightness is lower than that of white.

According to the above configuration, in the multilayer portion of the printing layer, the color layer is formed directly under the transparent layer, and the low brightness layer is formed directly under the color layer. Therefore, it is possible to reproduce the sense of depth of the transparent part in the target object. As a result, it is possible to more effectively reproduce the sense of depth of the transparent part as compared with the case where the sense of depth of the transparent part is reproduced only by the transparent layer.

Further, in the above-mentioned printed matter forming method, it is suitable that the light scattering characteristics of the target object, the internal scattering member, and the fluid are characteristics represented by a modulation transfer function or a bidirectional scattering surface reflectance distribution function.

According to the above configuration, it is possible to quantitatively grasp the light scattering characteristic of each constituent material of the printed matter.

Further, according to another aspect of the present invention, in order to solve the above-mentioned problems, there is provided a printed matter forming system that forms a printed matter by forming a printing layer on a surface of an internal scattering member in order to reproduce a texture of a surface of a target object. The printed matter forming system comprises: a light scattering characteristic data acquisition device that acquires data about light scattering characteristics; a printing layer forming device that forms a printing layer on the surface of the internal scattering member; a print control device that forms the printing layer on the printing layer forming device. The light scattering characteristic data acquisition device acquires first light scattering characteristic data about the light scattering characteristic of the target object with respect to incident light on the surface of the target object, the light scattering characteristic data acquisition device acquires second light scattering characteristic data about a light scattering characteristic of a fluid constituting the printing layer, for each type of the fluid, the light scattering characteristic data acquisition device further acquires third light scattering characteristic data about a light scattering characteristic of the internal scattering member, the print control device estimates the light scattering characteristic of the printed matter corresponding to the formation condition of the printing layer, based on the second light scattering characteristic data and the third light scattering characteristic data for each type of the fluid, and then sets the formation condition employed at the time of forming the printing layer, based on the estimated light scattering characteristic of the printed matter and the first light scattering characteristic data, and the printing layer forming device forms the printing layer on the surface of the internal scattering member in accordance with the formation condition which is set by the print control device.

According to the above-mentioned printed matter forming system, the printing layer can be formed so as to satisfactorily reproduce the texture of the surface of the target object based on the light scattering characteristic of the entire printed matter.

According to the present invention, a printed matter forming method and a printed matter forming system capable of forming a printing layer so as to satisfactorily reproduce the texture of the surface of a target object are realized based on the light scattering characteristic of the entire printed matter.

DESCRIPTION OF THE PREFERRED EMBODIMENTS

A printed matter forming method and a printed matter forming system according to an embodiment of the present invention (hereinafter referred to as "the present embodiment") will be described in detail below with reference to the accompanying drawings as appropriate.

It should be noted that the embodiments described below are merely examples for facilitating the understanding of the present invention, and do not limit the present invention. That is, the present invention may be modified or improved from the embodiments described below without departing from the spirit of the present invention. Further, it is apparent that the present invention includes an equivalent thereof.

Further, in the present specification, the numerical range represented by using "-" means a range including the numerical values before and after "-" as the lower limit value and the upper limit value.

Furthermore, in the present specification, unless otherwise specified, the laminating direction of the printing layers, which will be described later, is referred to as the vertical direction, the side closer to the substrate is referred to as the "lower side", and the side farther from the substrate is referred to as the "upper side".

Application of Printed Matter Forming System of Present Embodiment

In explaining the printed matter forming method and the printed matter forming system of the present embodiment, the application of the printed matter forming system of the present embodiment will be described.

The printed matter forming system of the present embodiment and the printed matter forming method realized by the system are used to form a printed matter that reproduces a texture of a surface of a target object. Here, the "target object" is a member that is the target of texture reproduction. Examples of the target object include a material whose surface texture (strictly speaking, optical texture) differs depending on a portion thereof. Specifically, the material may be a natural material including rocks such as granite and marble, stones, wood, hair, bones, skin (flesh), teeth, cotton, silk, and the like.

Figure 1:
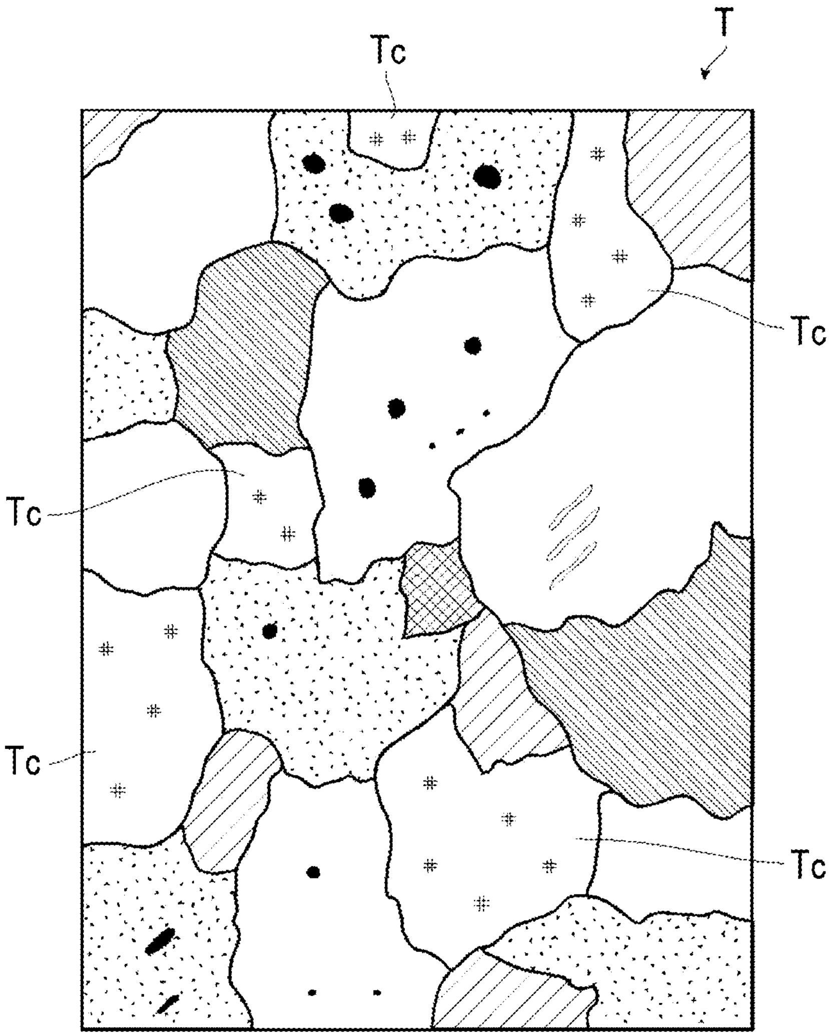
FIG. 1 is a diagram showing an example of a target object.

In the following, a case in which the granite T shown in FIG. 1 is the target object will be described as an example. However, it is apparent that the present embodiment is applicable to cases where other materials are target objects.

Further, in the present embodiment, the "texture" is, for example, a light scattering characteristic and a sense of depth. The sense of depth is the thickness of the transparent part (for example, quartz Tc appearing on the surface of the granite T shown in FIG. 1) exposed on the surface of the target object. Here, the thickness of the transparent part is the length from the surface of the target object to the interface between the transparent part and the part adjacent to the transparent part (specifically, the colored part immediately below the transparent part).

Figure 2:
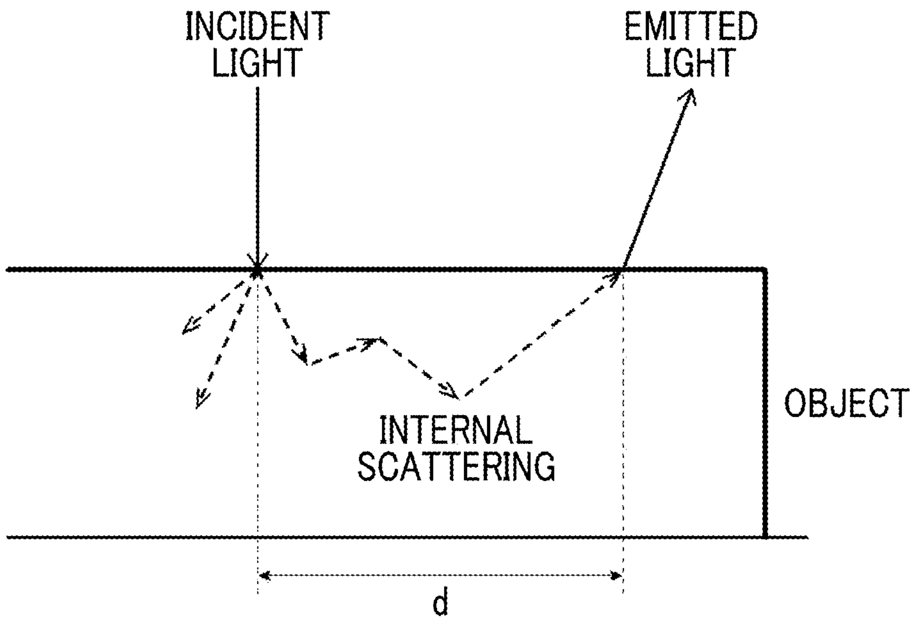
FIG. 2 is a schematic diagram showing an internal scattering phenomenon of light.

The light scattering characteristic is an internal scattering characteristic of the light (also referred to as subsurface scattering). Regarding internal scattering, in a case where light is applied to a target object, as shown in FIG. 2, the light is repeatedly reflected and scattered inside the target object, and therefore the light is emitted at a position away from the incidence position of the light on the surface of the target object. Further, the internal scattering characteristic of light is specified based on the distance from the incidence position of light to the emission position (distance d shown in FIG. 2) and the intensity of light at the emission position.

Figure 3:
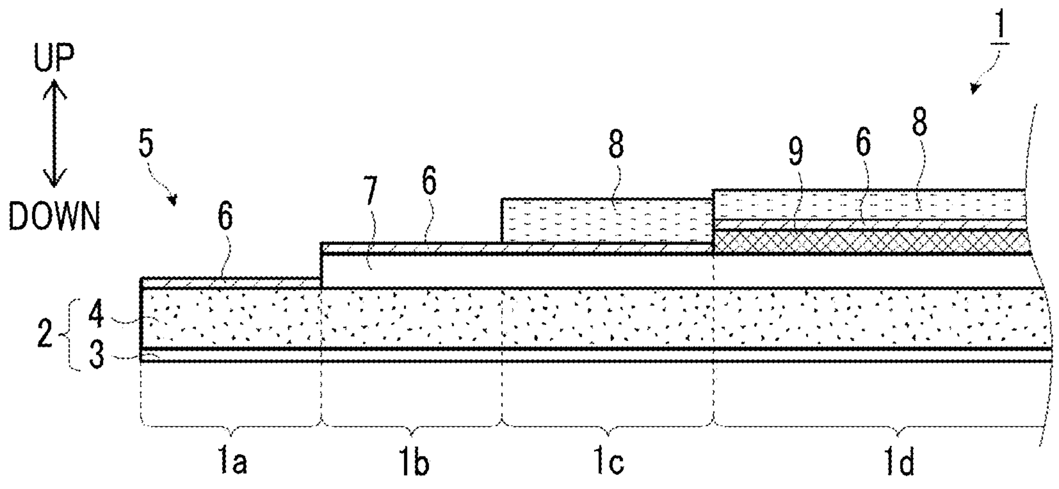
FIG. 3 is a schematic view showing the structure of a printed matter.

In the present embodiment, in order to reproduce the texture of the surface of the target object described above, texture reproduction printing is performed in which a printing layer made of ink is formed on the substrate. By this texture reproduction printing, the printed matter 1 shown in FIG. 3 is formed. The color, pattern, and texture of the surface of the target object is reproduced on the surface of the printed matter 1 (the surface on the side to be visually recognized). Hereinafter, the printed matter 1 will be described with reference to FIG. 3. It should be noted that since FIG. 3 schematically shows the configuration of the printed matter 1, for convenience of illustration, the thickness and size of each part are different from the actual thickness and size.

The printed matter 1 is composed of a substrate 2 shown in FIG. 3 and the printing layer 5 formed on the surface (printing surface) of the substrate 2. The substrate 2 used for texture reproduction printing is a substrate for texture reproduction printing (hereinafter, the texture reproduction substrate 2).

The texture reproduction substrate 2 is a laminate formed by laminating a thin plate-shaped internal scattering member 4 on white paper which is a white medium 3. Here, the internal scattering member 4 is a semi-transparent (for example, semi-turbid color or milky semi-colored) light transmitting member, and is a member of which the difference between the total light transmittance and the scattered light transmittance is 0% to 10%. Specific examples of the internal scattering member 4 include a substrate used for inkjet printing using an ultraviolet curable ink, such as a milky semi-colored or white acrylic plate, a vinyl chloride material, or a polyethylene terephthalate (PET) material. The internal scattering member 4 is more preferably a member having a total light transmittance of 10% to 80% or less and a transmitted light transmittance of 10% to 80%. The Haze value of the internal scattering member 4 is preferably 1 to 90%, and more preferably 30 to 60%.

Further, the thickness of each part of the internal scattering member 4 may be uniform or may be different depending on the position of each part.

The white paper, which is the white medium 3, constitutes the bottom layer of the printed matter 1. The white medium 3 is in close contact with the internal scattering member 4, for example, is adhered to the surface of the internal scattering member 4. However, the white medium 3 is not limited to the case where the white medium 3 is adhered to the internal scattering member 4, and may be in contact with the internal scattering member 4. Further, it is preferable that the white medium 3 has the highest light reflectance in the printed matter 1 and is set so that the reflectance is 90% or more. The white medium 3 is not limited to white paper. However, it is possible to use a white sheet, a film, a plate material, a fiber (cloth), a plastic substrate (for example, acrylic material, polyethylene terephthalate (PET) material, or vinyl chloride material), or the like.

The printing layer 5 consists of a layer of ink that has landed (adhered) to the surface of the substrate 2 that is the printing surface. The inks used in the present embodiment are color inks of four colors which are yellow, magenta, cyan, and black (YMCK), white ink which is a white fluid, gray ink, and clear ink which is a transparent fluid. The color ink is an example of a fluid, and is a general ink that contains a colored pigment or dye and is used for color printing. The white ink is an example of a fluid, and is a white ink containing a white pigment or dye and used for, for example, underprinting. The gray ink is an example of a fluid, and is an ink containing carbon black as a coloring material at a low concentration. The clear ink is an example of a fluid, and is an ultraviolet curable transparent fluid that is cured by receiving light (specifically, ultraviolet rays). The transparent fluid used in the present invention is not limited to the clear ink, and may be any fluid that can be cured by irradiation with light. Further, examples of the irradiation light include ultraviolet rays, infrared rays, visible light and the like.

Then, in the present embodiment, the formation area of the printing layer 5 on the printing surface is divided into a plurality of unit regions, and the printing layer 5 is image-wise (image-like) in accordance with the position of each unit region as shown in FIG. 3. As a result, the texture reproduced in the printed matter 1 changes in accordance with each part of the printed matter 1. In other words, the texture of each part of the printed matter 1 is determined in accordance with the structure (layer structure) of each part of the printing layer 5.

Here, the unit region, which is a unit for partitioning the formation area of the printing layer 5 on the printing surface, is a minute square region as a divided region which is set in a case of defining the light scattering characteristic of the target object. More specifically, the unit region is, for example, a region, which is set to have a size corresponding to the resolution (pixels) in a case where the surface of the target object is captured by the camera in measurement of the light scattering characteristic using a camera or the like, or a wider sized region of which the size is averaged.

To explain the printing layer 5 in detail, as shown in FIG. 3, the printing layer 5 has a color layer 6 over the entire region (that is, the entire printing surface). The color layer 6 is a layer made of four YMCK color inks. In the printed matter 1 shown in FIG. 3, in the portion 1*a* where the color layer 6 is formed directly above the internal scattering member 4, the light that has passed through the color layer 6 is repeatedly reflected and scattered under the surface of the internal scattering member 4. Therefore, the color layer 6 looks blurry to the viewer. As a result, in the above-mentioned portion 1*a*, for example, in a case where the light incident on the above-mentioned multilayer structure is reflected at a position away from the incidence position due to internal scattering, the distance between the incidence position and the reflection position becomes long, and the light scattering characteristics reflected in the multiple directions are reproduced.

Further, in the printing layer 5 having a multilayer structure at least a part as shown in FIG. 3, a white layer 7 composed of white ink is formed in the part having the multilayer structure. More specifically, in the above-mentioned multilayer structure, the color layer 6 is disposed on the side opposite to the internal scattering member 4 through the white layer 7. In other words, the white layer 7 is present between the color layer 6 and the internal scattering member 4. Then, in the printed matter 1 shown in FIG. 3, the light that has passed through the color layer 6 is reflected by the white layer 7 in the portion 1*b* which has a multilayer structure and in which the white layer 7 is formed. Therefore, the color layer 6 can be seen relatively clearly by the viewer. As a result, in the above-mentioned portion 1*b*, for example, in a case where the light incident on the above-mentioned multilayer structure is reflected at a position away from the incidence position due to internal scattering, light scattering characteristics, in which the distance between the incidence position and the reflection position is not so large, are reproduced.

In a case where the target object has a transparent part, a transparent layer 8 composed of clear ink is formed on the portion of the printing layer 5 corresponding to the transparent part. As shown in FIG. 3, the transparent layer 8 is disposed on the outermost surface of the printing layer 5 at the part where the transparent layer 8 is formed. Then, in the printed matter 1 shown in FIG. 3, in the portions 1*c* and 1*d* where the transparent layer 8 is formed, the transparent part on the surface of the target object is drawn, and the texture (sense of depth) is reproduced.

In a case where the portion of the printing layer 5 corresponding to the transparent part has a multilayer structure, as shown in FIG. 3, the transparent layer 8, the color layer 6, and the white layer 7 are formed in this order from above in the part. That is, in the above-mentioned multilayer structure, the color layer 6 is disposed adjacent to the transparent layer 8 (that is, directly under the transparent layer 8) between the transparent layer 8 and the internal scattering member 4. Further, the white layer 7 is disposed directly above the internal scattering member 4 in the color layer 6 and the internal scattering member 4. Then, in the printed matter 1 shown in FIG. 3, in the portions 1*c* and 1*d* where the above three layers are formed, the light scattering characteristic of the colored part directly under the transparent part are reproduced together with the sense of depth of the transparent part.

Further, in a case where the portion of the printing layer 5 corresponding to the transparent part has a multilayer structure, a low brightness layer 9 may be formed in addition to the above three layers (the color layer 6, the white layer 7, and the transparent layer 8). The low brightness layer 9 is a color having a lower brightness than white, for example, a gray-colored layer. In the present embodiment, the gray low brightness layer 9 is composed of, for example, gray ink, but may be composed of black ink and white ink. The color of the low brightness layer 9 may be a color other than gray, for example, black, as long as the color is a color having a lower brightness than white.

Further, the low brightness layer 9 is disposed adjacent to the color layer 6 (that is, directly below the color layer 6) between the color layer 6 and the internal scattering member 4 in the above-mentioned multilayer structure. Then, in the printed matter 1 shown in FIG. 3, in the portion 1*d* having a multilayer structure (specifically, a four-layer structure) including the low brightness layer 9, the sense of depth of the transparent part will be reproduced using both the transparent layer 8 and the low brightness layer 9. The reason for this is that the provision of the low brightness layer 9 exerts a visual effect that makes the viewer feel the depth. As a result, it is possible to more effectively reproduce the sense of depth of the transparent part as compared with the case where the sense of depth of the transparent part is reproduced only by the transparent layer 8. To give description in an easy-to-understand manner, by providing the low brightness layer 9, the thickness of the transparent layer 8, which is necessary to reproduce the same sense of depth as in a case where the low brightness layer 9 is not provided, can be made thinner. As a result, it is possible to shorten the formation time of the printing layer 5 (that is, the time necessary for the texture reproduction time).

Figure 4:
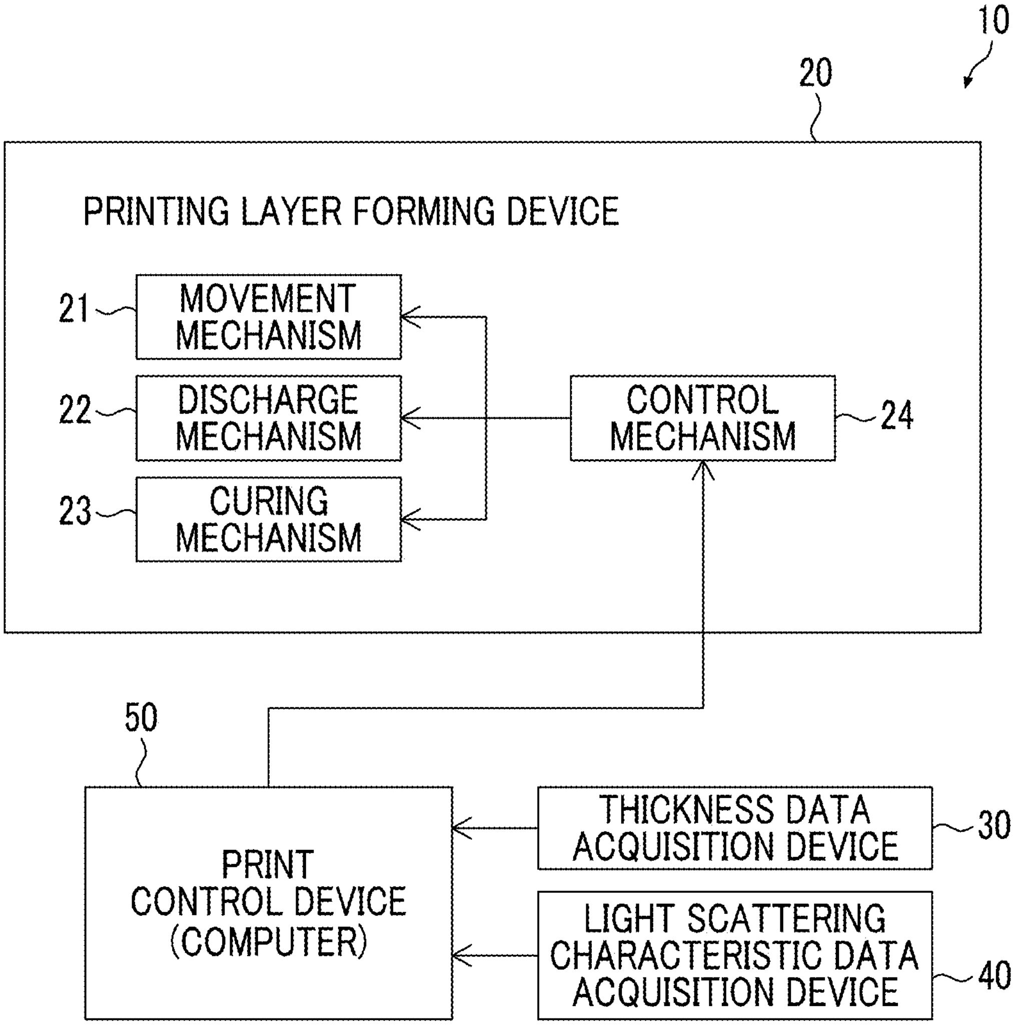
FIG. 4 is a diagram showing a configuration of a printed matter forming system.

Configuration of Printed Matter Forming System According to Present Embodiment Next, the configuration of the printed matter forming system 10 according to the present embodiment will be described. The printed matter forming system 10 is a facility that forms a printing layer 5 on the printing surface of the substrate 2 (strictly speaking, the upper surface of the internal scattering member 4) and produces the printed matter 1 in order to reproduce the texture of the surface of the target object. As shown in FIG. 4, the printed matter forming system 10 includes a printing layer forming device 20, a thickness data acquisition device 30, a light scattering characteristic data acquisition device 40, and a print control device 50, as main constituent devices. Hereinafter, each component device of the printed matter forming system 10 will be described individually.

(Printing Layer Forming Device)

The printing layer forming device 20 is an apparatus for forming the printing layer 5 by adhering ink to the printing surface of the substrate 2 (that is, the upper surface of the internal scattering member 4), and is configured by, for example, an inkjet printer.

Specifically, the printing layer forming device 20 discharges the various inks described above toward the printing surface of the substrate 2 to form an ink layer consisting of dots of ink that have landed on the printing surface. As a result, the printing layer 5 consisting of one or more ink layers is formed in each unit region of the printing layer formation area on the printing surface of the substrate 2.

Figure 5:
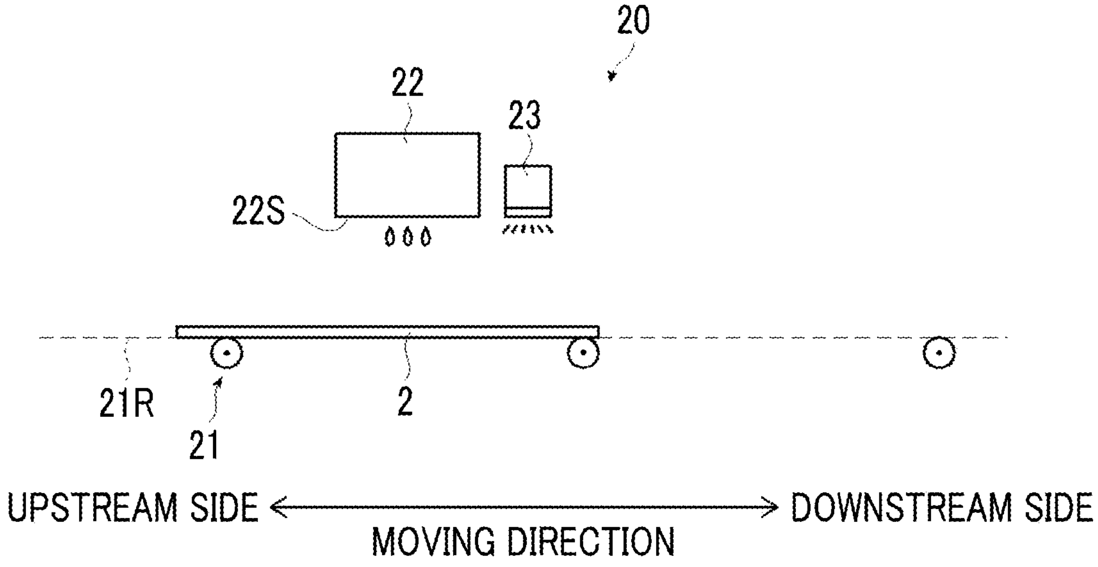
FIG. 5 is a schematic view showing a configuration of a printing layer forming device.

As shown in FIGS. 4 and 5, the printing layer forming device 20 includes a moving mechanism 21, a discharge mechanism 22, a curing mechanism 23, and a control mechanism 24. The moving mechanism 21 moves the substrate 2 along the movement path 21R in the printing layer forming device 20. The moving mechanism 21 may be configured by a drive roller as shown in FIG. 5, or may be configured by a drive belt. The moving mechanism 21 may be a one-way transport type moving mechanism that moves the substrate 2 only in the forward direction. The moving mechanism 21 may be a reversible transport type moving mechanism that moves the substrate 2 downstream along the movement path 21R by a certain distance, then reversely moves the substrate 2 upstream, and thereafter moves the substrate 2 again to the downstream side.

Figure 6:
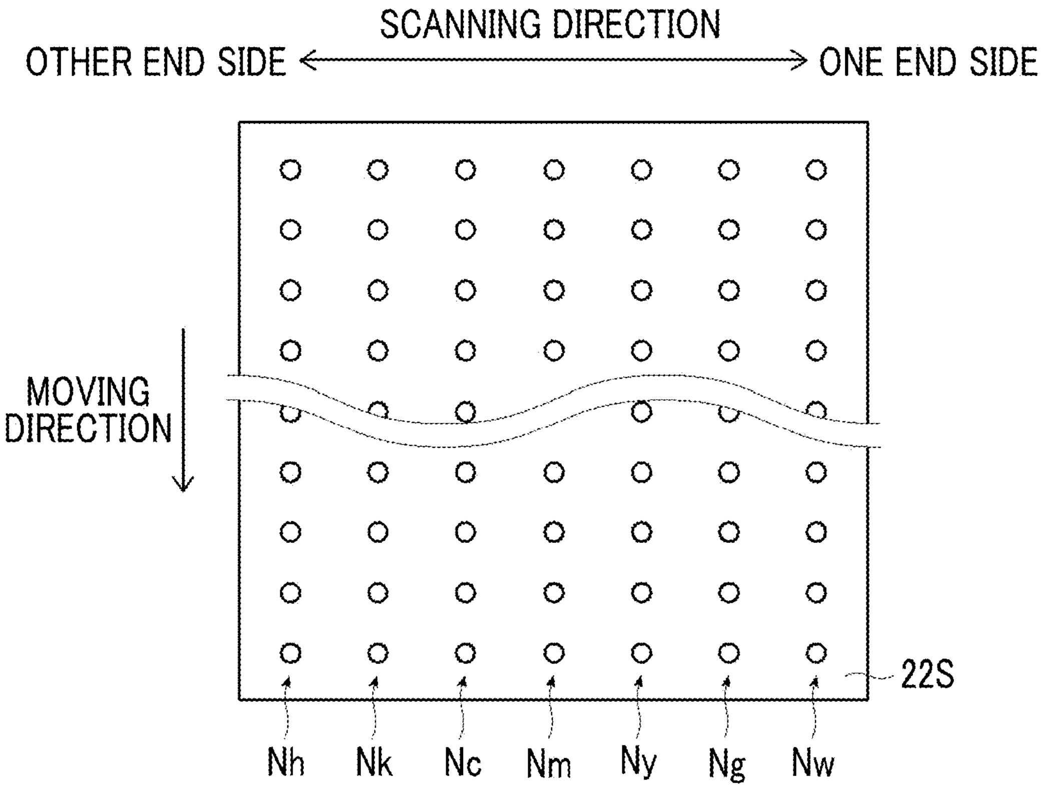
FIG. 6 is a diagram showing a nozzle surface of a discharge mechanism included in the printing layer forming device.

The discharge mechanism 22 is composed of a recording head that discharges various inks by driving a piezo element. While the lower surface of the discharge mechanism 22 faces the printing surface of the substrate 2, various inks are discharged toward the printing surface as shown in FIG. 5. More specifically, the discharge mechanism 22 is movable in the scanning direction intersecting the moving direction of the substrate 2. Further, as shown in FIG. 6, the lower surface of the discharge mechanism 22 is a nozzle surface 22S in which nozzle rows are formed for each ink type. On the nozzle surface 22S, in order from one end side in the scanning direction, a nozzle row Nw for discharging white ink, a nozzle row Ng for discharging gray ink, a nozzle row Ny for discharging yellow ink, a nozzle row Nm for discharging magenta ink, a nozzle row Nc for discharging cyan ink, a nozzle row Nk for discharging black ink, and a nozzle row Nh for discharging clear ink each are provided one row at a time. However, the number of nozzle rows for discharging various inks, the arrangement position thereof, and the like can be arbitrarily set, and a configuration other than the configuration shown in FIG. 6 may be used.

Then, in a state where the nozzle surface 22S faces the printing surface of the substrate 2, while the discharge mechanism 22 moves in the scanning direction at a position directly above the printing surface by a carriage which is not shown in the shuttle scanning method, the type of ink corresponding to each unit region is discharged toward each unit region inside the printing surface. Various types of ink land on the unit region of the discharge destination to form dots. As a result, the printing layer 5 is formed on the surface of the substrate 2. In the printing layer 5, the color layer 6, the white layer 7, the transparent layer 8, and the low brightness layer 9 are disposed in an image-wise (image-like) manner in accordance with the positions of the respective unit regions.

The method of discharging ink from the discharge mechanism 22 is not limited to the piezo element driving method. For example, it is possible to use various discharge methods including a thermal jet method in which ink droplets are blown by the pressure of bubbles formed by heating ink with a heating element such as a heater. Further, in the present embodiment, the discharge mechanism 22 is composed of a serial type head and discharges ink by a shuttle scan method, but the present invention is not limited to this. For example, the discharge mechanism 22 may be configured by a full-line type head, and may discharge ink by a single-pass method. Further, in the present embodiment, all the nozzle rows of various inks are formed on the same nozzle surface 22S, but the present invention is not limited to this. For example, the discharge mechanism 22 may be composed of a plurality of recording heads, and each recording head may discharge inks of different types from each other.

The curing mechanism 23 cures the dots of the clear ink by irradiating the dots of the clear ink that have landed on the printing surface of the substrate 2 with light (strictly speaking, ultraviolet rays). The curing mechanism 23 is composed of, for example, a metal halide lamp, a high-pressure mercury lamp, an ultraviolet light emitting diode (LED), or the like, and is disposed downstream of the discharge mechanism 22 in the moving direction of the substrate 2 in the present embodiment.

In the present embodiment, the discharge mechanism 22 and the curing mechanism 23 are arranged apart from each other in the moving direction of the substrate 2. However, the present invention is not limited to this, and the following configuration may be adopted. The discharge mechanism 22 and the curing mechanism 23 is mounted on a common carriage (not shown), and the discharge mechanism 22 and the curing mechanism 23 move integrally in the scanning direction. In such a configuration, it is preferable that the curing mechanism 23 is disposed at a position beside the discharge mechanism 22. In addition, it is preferable that the curing mechanism 23 irradiates the clear ink (strictly speaking, the dots of the clear ink that have landed on the printing surface) with ultraviolet rays immediately after the discharge mechanism 22 discharges the clear ink in one scanning operation.

The control mechanism 24 is a controller built in the printing layer forming device 20, and controls each of the moving mechanism 21, the discharge mechanism 22, and the curing mechanism 23 through a drive circuit which is not shown. More specifically, the control mechanism 24 receives the print data sent from the print control device 50. The print data is data indicating the formation condition of the printing layer 5. The print data will be described in detail later.

Immediately after receiving the print data, for example, in a case where a predetermined substrate 2 is manually inserted into the substrate introduction port (not shown) of the printing layer forming device 20, the control mechanism 24 controls the moving mechanism 21 such that the moving mechanism 21 picks up the substrate 2 and moves the substrate 2 intermittently along the movement path 21R.

Next, the control mechanism 24 controls the discharge mechanism 22 in accordance with the print data while the nozzle surface 22S of the discharge mechanism 22 and the printing surface of the substrate 2 face each other, and discharges ink from the discharge mechanism 22 toward each unit region of the printing surface. At this time, the type, amount, density (density of dots), and the like of the ink to be landed on each unit region are determined in accordance with the formation condition indicated by the print data.

Further, the control mechanism 24 alternately repeats an operation of movement of the substrate 2 using the moving mechanism 21 and an operation of scanning of the discharge mechanism 22, and controls the nozzle for discharging ink in each scanning operation. As a result, dots of the ink can be superimposed on the same unit region on the printing surface. For example, by superimposing dots of the same type of ink, the thickness of the ink layer consisting of the ink can be adjusted. Further, by superimposing dots of another type of ink on the dots of one type of ink, the above-mentioned multilayer structure (for example, the multilayer structure in the portions 1*b*, 1*c* and 1*d* shown in FIG. 3) is formed.

The laminating order of each ink layer in the multilayer structure is as described above. For example, the transparent layer 8 consisting of the clear ink is disposed on the outermost surface.

Further, the control mechanism 24 controls the curing mechanism 23 such that the curing mechanism 23 irradiates the ink with ultraviolet rays in parallel with discharging the ink to the discharge mechanism 22. As a result, in the unit region where the dots of the clear ink are present, the dots of the clear ink are cured to form the transparent layer 8.

Then, in a case where the control mechanism 24 controls the moving mechanism 21, the discharge mechanism 22, and the curing mechanism 23 in accordance with the formation condition indicated by the print data, the number of laminated ink layers in each unit region and the type and thickness of each ink layer are adjusted for each unit region. In other words, each part of the printing layer 5 is formed image-wise (image-like) in accordance with the position of each part. As a result, the texture of the surface of the target object is reproduced on the surface of the printing layer 5 (the surface on the visible side).

Then, the substrate 2 on which the printing layer 5 is formed, that is, the printed matter 1, is moved to the discharge port of the printing layer forming device 20 by the moving mechanism 21, and is discharged from the discharge port to the outside of the printing layer forming device 20.

Figure 7:
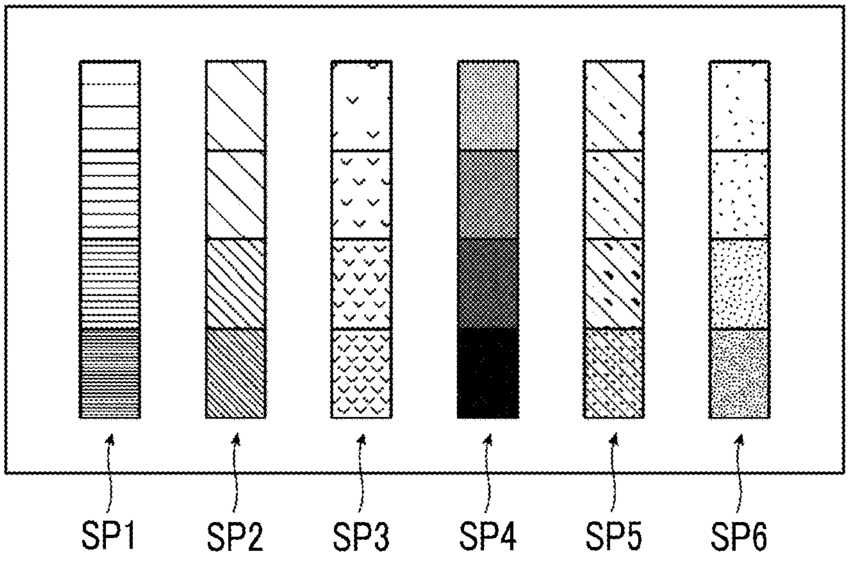
FIG. 7 is a diagram showing a sample pattern.

Further, the printing layer forming device 20 according to the present embodiment is able to form the sample patterns SP1 to SP6 shown in FIG. 7 on the substrate 2. Each of the sample patterns SP1 to SP6 consists of a single color and only one layer of ink. Then, the sample patterns SP1 to SP6 are formed as print images necessary for the light scattering characteristic data acquisition device 40, which will be described later, to acquire the light scattering characteristic data for each ink type.

Explaining the sample patterns SP1 to SP6, as shown in FIG. 7, the sample patterns SP1 to SP6 are formed by gradually changing the density of dots of each of the four YMCK color inks, the white ink, and the gray ink. Here, the density of dots means the occupancy rate of dots in a unit area, in other words, the pattern concentration (shading). The density of dots is determined by the dot size and the number of dots in a unit area.

In a case where the printing layer forming device 20 forms the sample patterns SP1 to SP6 on the substrate 2, the control mechanism 24 receives the print data for forming the sample pattern from the print control device 50. The print data for sample pattern formation defines the formation condition of each of sample patterns SP1 to SP6 (specifically, the formation position, the type of ink used, the density of dots, and the like of each of the sample patterns SP1 to SP6). In a case where the control mechanism 24 receives the print data for forming the sample pattern, the control mechanism 24 controls the moving mechanism 21, the discharge mechanism 22, and the curing mechanism 23 in accordance with the print data. As a result, for each color of ink, sample patterns SP1 to SP6 are formed on the substrate 2 while changing the density of dots stepwise. The substrate 2 used for forming the sample pattern may be a texture reproduction substrate 2, or may be a substrate 2 (for example, white paper) different from the texture reproduction substrate 2.

(Thickness Data Acquisition Device)

The thickness data acquisition device 30 is a device that acquires thickness data about the thickness of a transparent part exposed on the surface of a target object. The thickness data acquisition device 30 according to the present embodiment is composed of an X-ray CT (Computed Tomography) measuring device. The thickness data acquisition device 30 measures the thickness of the transparent part by acquiring a tomographic image of a target object by an X-ray CT scan, performing rendering processing on the tomographic image, and making the transparent part three-dimensional (for example, refer to "Tsushi Nakano, Yoshito Nakajima, Koichi Nakamura, Susumu Ikeda, Observation and Analysis Method of Rock Internal Structure by X-ray CT", Geological Journal, Vol. 106, No. 5, pp. 363 to 378, May 2000).

Further, in the present embodiment, the surface of the target object is divided into a plurality of unit surface regions. Then, the thickness data acquisition device 30 measures the thickness for each unit surface region, and acquires the thickness data indicating the thickness for each unit surface region. Here, the unit surface region is a unit in a case where the surface of a target object (strictly speaking, the surface to be reproduced as a texture) is divided in a way the same as a way of dividing the formation area of the printing layer 5 on the printing surface of the substrate 2 into a plurality of unit regions.

Figure 8:
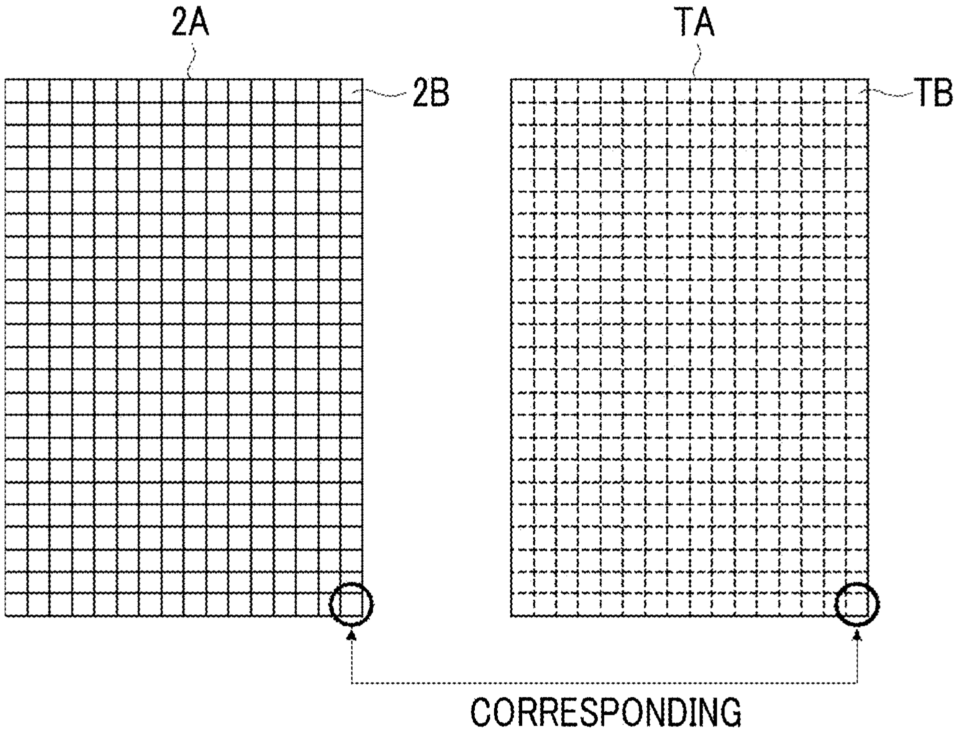
FIG. 8 is a diagram showing a surface of a target object and a region where a printing layer is formed on a printing surface of a substrate.

Explaining in an easy-to-understand manner with reference to FIG. 8, both the printing layer formation area on the printing surface (indicated by the symbol 2A in FIG. 8) and the surface of the target object (indicated by the symbol TA in FIG. 8) each have a rectangular shape. In a case where each is divided into a plurality of minute regions, each minute region constituting the printing layer formation area is the above-mentioned unit region (indicated by the symbol 2B in FIG. 8), and each minute region constituting the surface of the target object is the unit surface region (indicated by the symbol TB in FIG. 8).

In FIG. 8, for convenience of illustration, the number of unit regions constituting the printing layer formation area and the number of unit surface regions constituting the surface of the target object are shown to be smaller than the actual number.

Further, each unit surface region on the surface of the target object is associated with a unit region disposed at the same position as the disposition position of each unit surface region in the printing layer formation area on the printing surface. For example, in FIG. 8, the unit surface region TB and the unit region 2B surrounded by a round frame correspond to each other.

(Light Scattering Characteristic Data Acquisition Device)

The light scattering characteristic data acquisition device 40 acquires light scattering characteristic data which is data about the light scattering characteristic. In the present embodiment, the light scattering characteristic is represented by a modulated transfer function (hereinafter referred to as MTF) or a bidirectional scattering surface reflectance distribution function (hereinafter referred to as BSSRDF). That is, the light scattering characteristic data acquisition device 40 acquires the light scattering characteristic data indicating the light scattering characteristic represented by the above function. Further, the light scattering characteristic data acquisition device 40 according to the present embodiment acquires light scattering characteristic data of each of a plurality of types of light having different wavelengths, specifically, light of each color of R (red), G (green), and B (blue).

Figure 9:
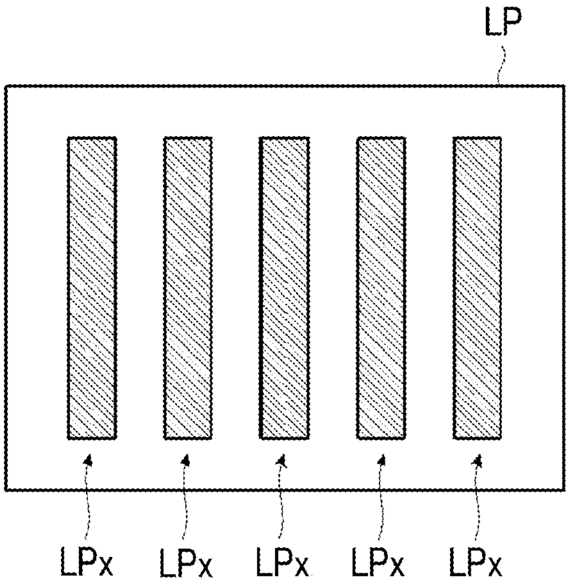
FIG. 9 is a diagram showing a square wave chart.

The method of acquiring data indicating the light scattering characteristic will be roughly described. The light scattering characteristic represented by MTF is acquired, for example, by measuring the light scattering characteristic of the measurement target using the square wave chart LP shown in FIG. 9. As shown in FIG. 9, the square wave chart LP is a measurement chart consisting of a plurality of rectangular patterns LPx formed on a transparent substrate such as a glass plate at predetermined intervals. In a case of measuring the light scattering characteristics, the measurement target and the square wave chart LP are brought into close contact with each other, and the light is made incident from the square wave chart LP side, thereby measuring the reflected light of the measurement target. At this time, as a result of the transmitted light of the square wave chart LP being scattered inside the measurement target, the edge part of the rectangular pattern LPx is blurred and measured slightly dark. Qualitatively speaking, this degree of blurring indicates the light scattering characteristic of the measurement target. Further, as a method of quantitatively evaluating the degree of blurring, that is, the light scattering characteristic of the measurement target, a method of calculating the MTF showing the light scattering characteristic can be used.

As an example of the method of calculating the MTF, the method described in JP2012-205124A can be mentioned. However, the method is not limited to the method described in the same publication, and an MTF indicating light scattering characteristic may be calculated in another method.

Regarding the light scattering characteristic represented by BSSRDF, the intensity of the incident light in the irradiation direction to the measurement target and the intensity of the reflected light of the measurement target in the observation direction can be obtained by being measured in changing the irradiation direction and the observation direction, respectively. As a method of acquiring the light scattering characteristic data shown by BSSRDF, a known method can be used (for example, refer to "Cuccia D J, Bevilacqua F, Durkin A J, Tromberg B J (2005) Modulated imaging: quantitative analysis and tomography of turbid media in the spatial-frequency domain. Opt Lett 30(11): 1354 to 1356"). Further, the light scattering characteristic of BSSRDF may be measured by using the measuring device described in JP-A-2017-020816.

Figure 10:
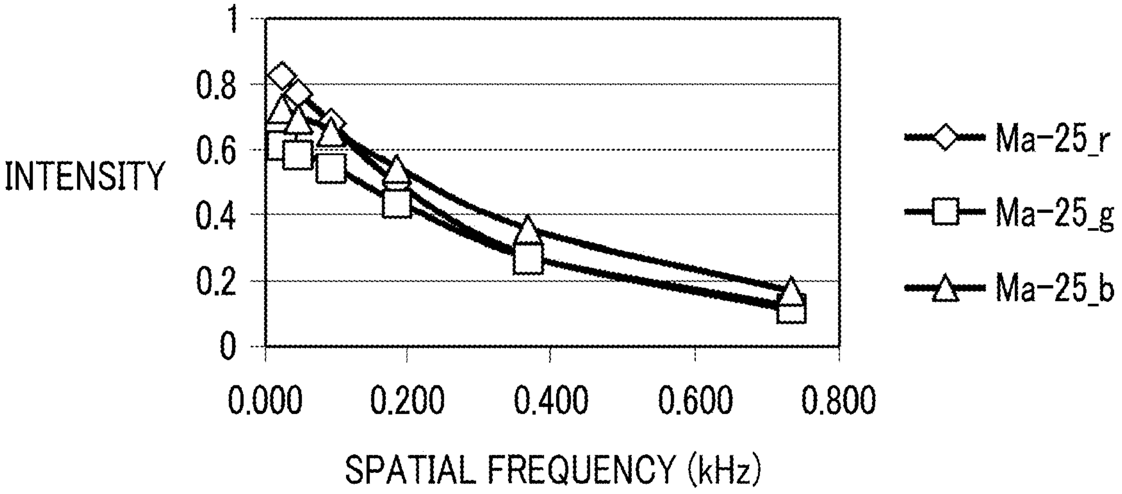
FIG. 10 is a diagram showing an example of light scattering characteristic data.

As described above, the light scattering characteristic data acquisition device 40 is able to acquire the light scattering characteristic data of the measurement target as shown in FIG. 10 by measuring the light scattering characteristic of the measurement target using the light of each of the three RGB colors. FIG. 10 is a diagram showing MTFs each indicating the light scattering characteristic of the measurement target for each color of light. The horizontal axis of FIG. 10 indicates the spatial frequency, and the vertical axis of FIG. 10 indicates the intensity of the reflected light (ratio to the intensity of the incident light).

In the present embodiment, the light scattering characteristic is represented by MTF or BSSRDF, and the data indicating the measurement result is acquired by the light scattering characteristic data acquisition device 40. However, the present invention is not limited to this. For example, the light scattering characteristic may be represented by a point spread function (PSF), and data indicating the measurement result may be acquired.

Then, the light scattering characteristic data acquisition device 40 according to the present embodiment measures the light scattering characteristics of various members as measurement targets, and acquires the light scattering characteristic data.

Specifically, the light scattering characteristic data acquisition device 40 first measures the light scattering characteristic of the target object for reproducing the texture. As a result, the light scattering characteristic data acquisition device 40 acquires data about the light scattering characteristic with respect to the incident light on the surface of the target object (hereinafter, referred to as first light scattering characteristic data). In the present embodiment, the surface of the target object is divided into a plurality of unit surface regions as described above, and the light scattering characteristic data acquisition device 40 acquires the first light scattering characteristic data indicating the light scattering characteristic for each unit surface region.

Secondly, the light scattering characteristic data acquisition device 40 acquires data about the light scattering characteristic of the various inks constituting the printing layer 5 (hereinafter, referred to as second light scattering characteristic data). Specifically, as described above, the printing layer forming device 20 changes the density of dots stepwise for each color ink of the four YMCK color inks, the white ink, and the gray ink, and forms a plurality of sample patterns SP1 to SP6 (refer to FIG. 7). The light scattering characteristic data acquisition device 40 measures the light scattering characteristic for each of the sample patterns SP1 to SP6. As a result, the light scattering characteristic data acquisition device 40 acquires the second light scattering characteristic data for each ink type for each density by changing the density of dots.

Third, the light scattering characteristic data acquisition device 40 measures the light scattering characteristic for each of the plurality of types of internal scattering members 4 constituting the texture reproduction substrate 2. As a result, the light scattering characteristic data acquisition device 40 acquires data relating to the light scattering characteristic of each type of internal scattering member 4 (hereinafter, third light scattering characteristic data). Here, it is assumed that the parameters that change in accordance with the internal scattering performance (light scattering characteristic) are different between the internal scattering members 4 that are different from each other. For example, the Haze value is different. In other words, the light scattering characteristic of the printed matter 1 can be changed by changing the type of the used internal scattering member 4 and changing the Haze value.

(Print Control Device)

The print control device 50 is a device that causes the printing layer forming device 20 to form the printing layer 5, and is composed of, for example, a host computer (hereinafter, simply referred to as "computer") connected to the printing layer forming device 20.

The computer forming the print control device 50 is equipped with a processor such as a central processing unit (CPU) and a memory such as a read only memory (ROM) and a random access memory (RAM). The memory stores an application program for texture reproduction and programs such as a printer driver. Then, the print control device 50 creates print data for satisfactorily reproducing the texture of the surface of the target object by the processor executing the application program and the printer driver for reproducing the texture.

Explaining the print data for reproducing the texture, the print data is data indicating the formation condition of the printing layer 5 as described above. Here, the formation condition is defined as a combination of parameters such as the number of laminated layers (strictly speaking, ink layers) constituting the printing layer 5, the type of ink constituting each layer, the thickness of each layer, the density (concentration) of dots in each layer, and the type of the internal scattering member 4 of the texture reproduction substrate 2. A plurality of formation conditions can be determined by changing each of the above-mentioned parameters. Among the parameters, the parameter actually employed at the time of print formation is selected in accordance with the texture to be reproduced.

The formation condition of the printing layer 5 may be any condition relating to at least one of the above parameters, and may include a condition relating to parameters other than the above parameters.

Further, in the present embodiment, the printing layer formation area on the printing surface of the substrate 2 is divided into a plurality of unit regions, and the formation condition actually employed at the time of forming the printing layer 5 is set for each unit region.

Then, the print control device 50 creates print data indicating the formation condition which is set for each unit region, and transmits the print data to the printing layer forming device 20. In the printing layer forming device 20, the control mechanism 24 receives the print data and controls each unit of the printing layer forming device 20 in accordance with the print data. As a result, the printing layer forming device 20 forms the printing layer 5 on the printing surface of the substrate 2. At this time, the printing layer forming device 20 forms each part of the printing layer 5 in accordance with the formation condition which is set for the unit region corresponding to each part. As a result, each part of the printing layer 5 is formed in an image-wise (image-like) manner in accordance with the position of each part.

The procedure for creating print data will be described in detail in the next section "Procedure for Forming Printed Matter".

<Procedure for Forming Printed Matter>

Figure 11:
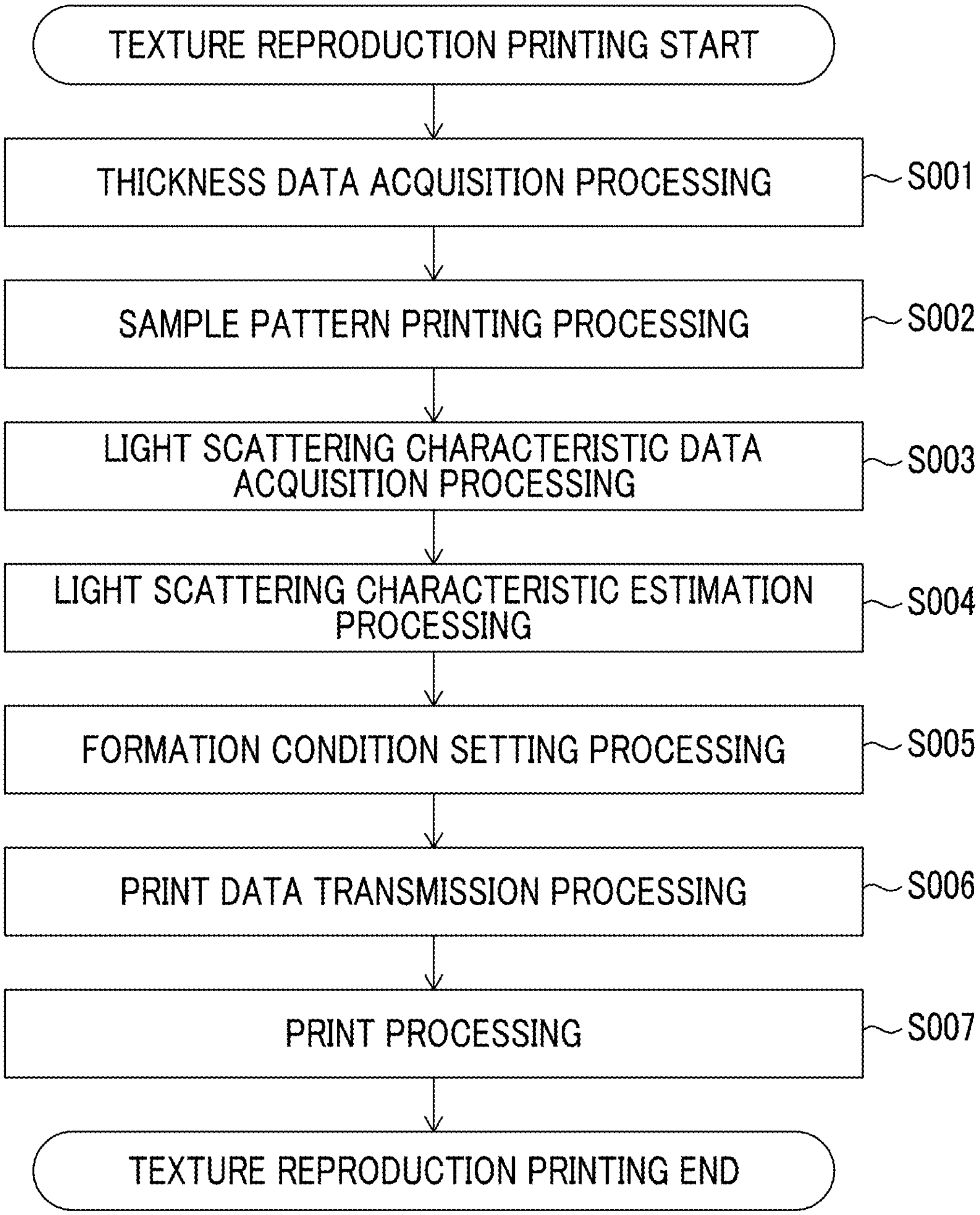
FIG. 11 is a flow chart of texture reproduction printing.

Next, the flow of the texture reproduction printing described above will be described as a procedure for forming the printed matter 1 by the printed matter forming method according to an embodiment of the present invention. As shown in FIG. 11, the texture reproduction printing is composed of thickness data acquisition processing S001, sample pattern printing processing S002, light scattering characteristic data acquisition processing S003, light scattering characteristic estimation processing S004, formation condition setting processing S005, print data transmission processing S006, and the print processing S007. Hereinafter, each processing will be specifically described.

(Thickness Data Acquisition Processing)

The thickness data acquisition processing is processing in which the thickness data acquisition device 30 acquires thickness data relating to the thickness of the transparent part exposed on the surface of the target object. More specifically, the surface of the target object is divided into a plurality of unit surface regions, and the thickness data acquisition device 30 measures the thickness of the transparent part for each unit surface region. It is apparent that the thickness in the unit surface region that does not correspond to the transparent part is 0.

Then, in a case where the thickness measurement for all the unit surface regions is completed, the thickness data acquisition device 30 acquires the thickness data indicating the thickness for each unit surface region. Further, the thickness data acquisition device 30 transmits the acquired thickness data to the print control device 50.

(Sample Pattern Printing Processing)

The sample pattern printing processing is processing in which the printing layer forming device 20 forms the above-mentioned sample patterns SP1 to SP6 on the printing surface of the substrate 2. More specifically, the print control device 50 transmits the print data for forming the sample pattern to the printing layer forming device 20, and the control mechanism 24 of the printing layer forming device 20 receives the print data. The print data for forming the sample pattern is created in advance and stored in the memory in the print control device 50.

The control mechanism 24 controls the moving mechanism 21, the discharge mechanism 22, and the curing mechanism 23 in accordance with the print data for forming the sample pattern. As a result, sample patterns SP1 to SP6 are printed on the printing surface of the substrate 2 by gradually changing the density (concentration) of dots for each of the six colors of YMCK, white, and gray ink (refer to FIG. 7). Each of the sample patterns SP1 to SP6 is composed of a plurality of pattern pieces having different densities (concentrations) of dots. Here, the number of pattern pieces constituting each of the sample patterns SP1 to SP6 and the density (concentration) of dots in each pattern piece can be freely set. However, in the example shown in FIG. 7, the number of pattern pieces is four, and the densities in respective pattern pieces are 25%, 50%, 75%, and 100%.

(Light Scattering Characteristic Data Acquisition Processing)

The light scattering characteristic data acquisition processing is processing in which the light scattering characteristic data acquisition device 40 acquires the first light scattering characteristic data, the second light scattering characteristic data, and the third light scattering characteristic data described above. More specifically, first, the surface of the target object is divided into a plurality of unit surface regions, and the light scattering characteristic data acquisition device 40 measures the light scattering characteristic (internal scattering characteristic) of the target object with respect to the incident light on the surface of the target object, for each unit surface region. As a result, the light scattering characteristic data acquisition device 40 acquires the first light scattering characteristic data indicating the light scattering characteristic for each unit surface region of the target object.

Next, the light scattering characteristic data acquisition device 40 measures the light scattering characteristic (internal scattering characteristics) for each of the sample patterns SP1 to SP6 printed on the substrate 2 through the above-mentioned sample pattern printing processing. At this time, the light scattering characteristic data acquisition device 40 measures the light scattering characteristic of each of the plurality of pattern pieces constituting the sample patterns SP1 to SP6. That is, the light scattering characteristic data acquisition device 40 measures the light scattering characteristic for each density of dots by changing the density (concentration) of dots of each of the sample patterns SP1 to SP6. As a result, the light scattering characteristic data acquisition device 40 acquires the second light scattering characteristic data indicating the light scattering characteristic for each density (concentration) of dots for each type of ink.

Next, the light scattering characteristic data acquisition device 40 measures the light scattering characteristic (internal scattering characteristic) of the internal scattering member 4 included in the texture reproduction substrate 2. At this time, in a case where a plurality of types of internal scattering members 4 are provided, the light scattering characteristic data acquisition device 40 measures the internal scattering characteristic of each type of internal scattering member 4. As a result, the light scattering characteristic data acquisition device 40 acquires the third light scattering characteristic data indicating the light scattering characteristic of the internal scattering member 4 for each type of the internal scattering member 4.

Then, the light scattering characteristic data acquisition device 40 transmits the acquired first light scattering characteristic data, second light scattering characteristic data, and third light scattering characteristic data to the print control device 50. In addition, in the present embodiment, each light scattering characteristic data is data which shows the light scattering characteristic represented by MTF or BSSRDF.

(Light Scattering Characteristic Estimation Processing)

In the light scattering characteristic estimation processing, the print control device 50 is the processing of estimating the light scattering characteristic of the printed matter 1 corresponding to the formation condition of the printing layer 5, based on the second light scattering characteristic data and the third light scattering characteristic data for each ink type. Here, the "light scattering characteristic of the printed matter 1 corresponding to the formation condition of the printing layer 5" is the light scattering characteristic of the printed matter 1 formed in a case where the printing layer 5 is tentatively formed under a certain formation condition.

Further, in the present embodiment, as described above, the formation condition of the printing layer 5 is set for each unit region. In accordance with this, also in the light scattering characteristic estimation processing, the light scattering characteristic of the printed matter 1 is estimated for each unit region.

Explaining the light scattering characteristic estimation processing in detail, a plurality of formation conditions of the printing layer 5 are provided at the start of this processing. Specifically, there are provided a plurality of combinations of the number of laminated ink layers constituting the printing layer 5, the type of ink constituting each ink layer, the thickness of each ink layer, the density (concentration) of dots in each ink layer, and the type of the internal scattering member 4 of the texture reproduction substrate 2, and the like.

Figure 12:
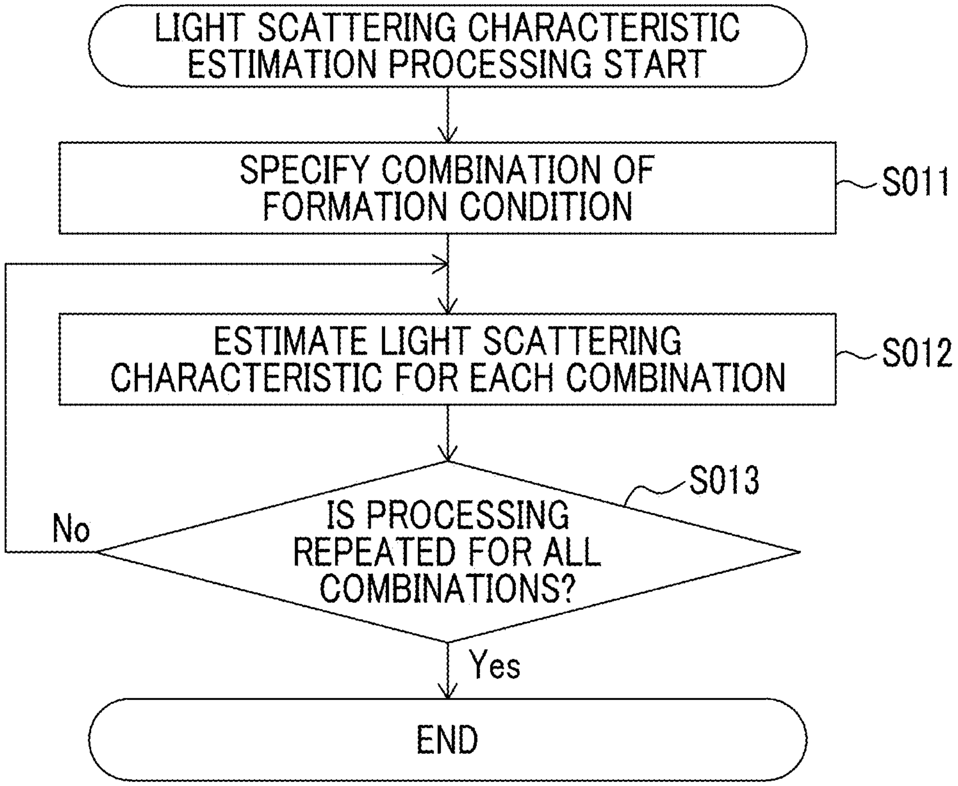
FIG. 12 is a diagram showing a flow of a light scattering characteristic estimation processing.

After that, the print control device 50 performs the light scattering characteristic estimation processing in accordance with the flow shown in FIG. 12. Explaining the flow of the light scattering characteristic estimation processing with reference to FIG. 12, the print control device 50 first sets a plurality of combinations each relating to the formation condition of the printing layer 5 for each unit region (S011). In step S011, the contents of the above-mentioned formation condition, specifically, the number of laminated ink layers constituting the printing layer 5, the type of ink constituting each ink layer, the thickness of each ink layer, the density of dots in each ink layer, and the type of the internal scattering member 4 each are used as a parameter. Then, possible combinations of the parameters are specified.

Next, for each of the plurality of combinations relating to the formation condition which is set in step S011, the print control device 50 estimates the light scattering characteristic reproduced under the formation condition relating to the combination for each unit region (S012). Here, in a case where the light scattering characteristic is represented by BSSRDF, in order to estimate the BSSRDF characteristic as the light scattering characteristic, light scattering matrix calculation is performed using the combination of the conditions which are set in step S011, the second light scattering characteristic data for each ink type acquired for each density of dots, and the third light scattering characteristic data acquired for each type of the internal scattering member 4.

The light scattering matrix calculation is a matrix calculation for reflection and transmission of light (incident light) incident on a laminated structure in each layer. This matrix calculation is performed until the incident light passes through the laminated structure, or until the incident light is repeatedly transmitted and reflected in each layer of the laminated structure and emitted from the outermost surface of the laminated structure. In a laminated structure having a large number of layers, the matrix calculation ends in a case where the amount of light is sufficiently attenuated or in a case where light passes through a predetermined number or more of layers.

Explaining the light scattering matrix calculation in detail, the BSSRDF characteristics in a certain layer (layer M shown in FIGS. 13 to 16) in the laminated structure are classified into the following four patterns.

Figure 13:
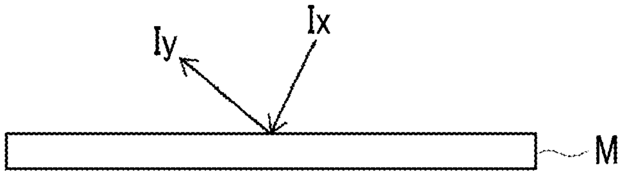
FIG. 13 is a diagram showing a first pattern for BSSRDF characteristics.

Pattern (1): As shown in FIG. 13, light Ix is incident from the upper side of the layer M, and light Iy travels (that is, reflects) toward the upper side of the layer M.

Figure 14:
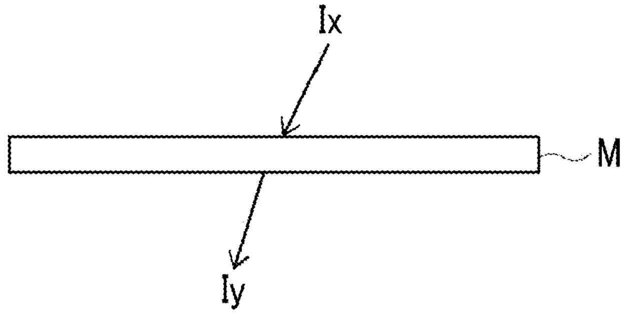
FIG. 14 is a diagram showing a second pattern for BSSRDF characteristics.

Pattern (2): As shown in FIG. 14, light Ix is incident from the upper side of the layer M, and light Iy travels (that is, transmits) toward the lower side of the layer M.

Figure 15:
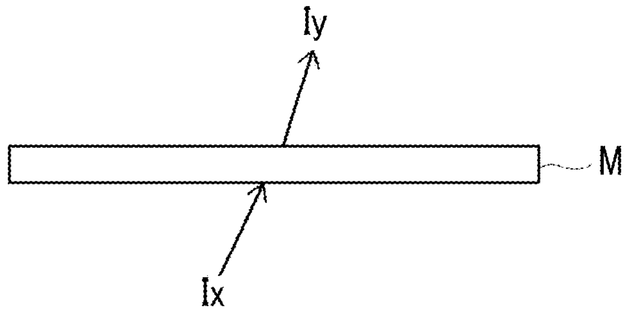
FIG. 15 is a diagram showing a third pattern for BSSRDF characteristics.

Pattern (3): As shown in FIG. 15, light Ix is incident from the lower side of the layer M, and light Iy travels (that is, transmits) toward the upper side of the layer M.

Figure 16:
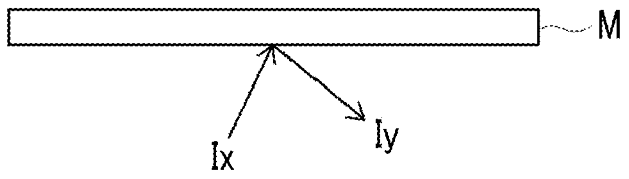
FIG. 16 is a diagram showing a fourth pattern for BSSRDF characteristics.

Pattern (4): As shown in FIG. 16, light Ix is incident from the lower side of the layer M, and light Iy travels (that is, reflects) toward the lower side of the layer M.

A corresponding calculation matrix R is set for each of the above four patterns. The calculation matrix R is a calculation expression (for example, a determinant) shown in FIG. 17. A light scattering vector after light is scattered through the layer M (that is, the light scattering vector on the emitting side) can be calculated by multiplying the later light scattering vector on the incidence side by the calculation matrix R of the corresponding pattern.

Figure 17:
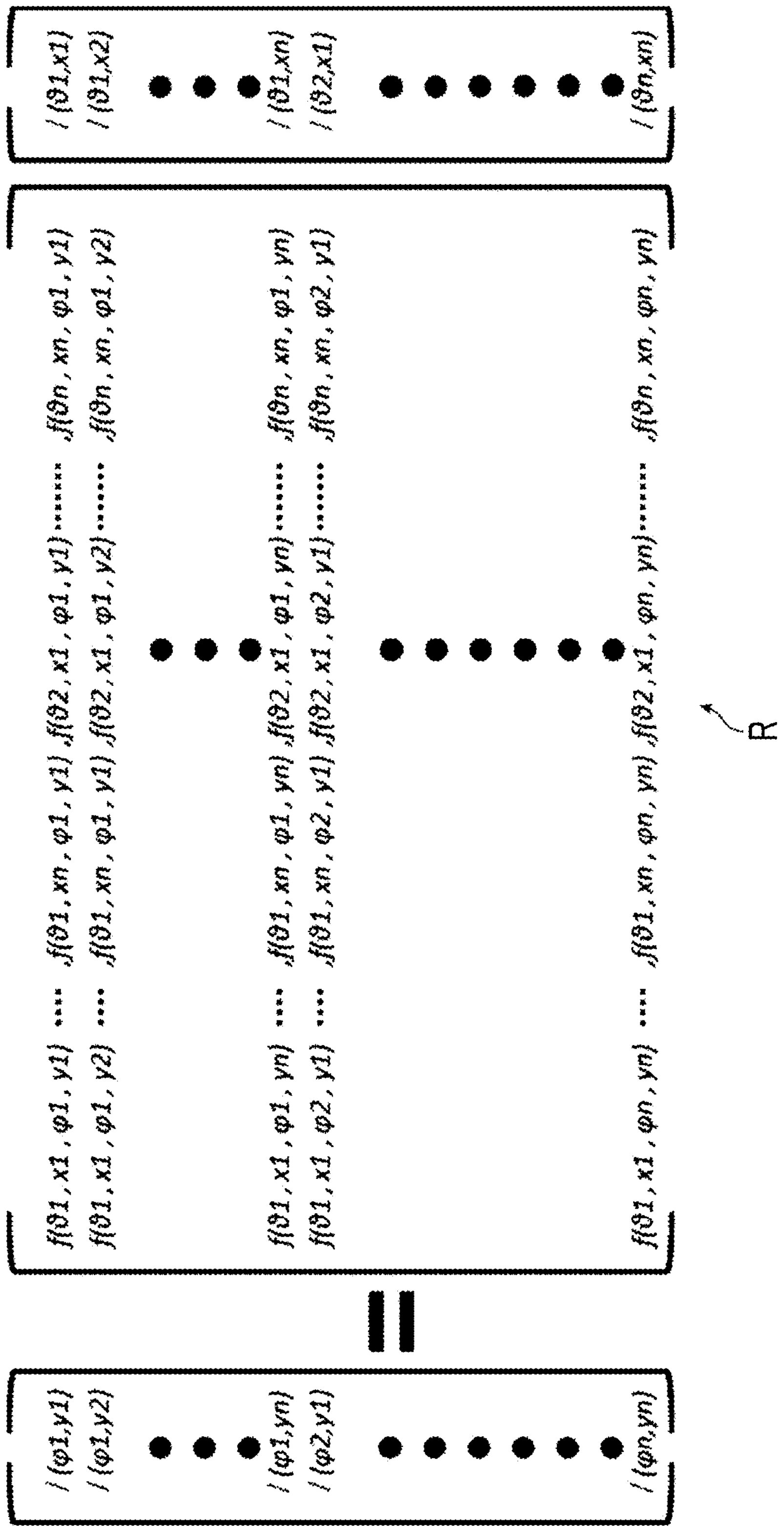
FIG. 17 is a diagram showing an arithmetic matrix.

The definitions of variables in FIG. 17 are as follows.

I: Light scattering vector, f: Arithmetic function

θi (i is a natural number from 1 to n): i-th incidence angle (vector)

Φi (i is a natural number from 1 to n): i-th emission angle (vector)

xk (k is a natural number from 1 to n): k-th incidence position yk (k is a natural number from 1 to n): k-th emission position xk (k is a natural number from 1 to n) indicates the k-th incidence position, and yk indicates the k-th emission position.

Assuming that there is no absorption, in a case where all the elements arranged in the same row in the calculation matrix R are added, the result thereof is 1 based on the law of conservation of energy.

Here, in a case where the arithmetic matrices R corresponding to the above four patterns are respectively represented as $RA_m$, $RB_m$, $RC_m$, and $RD_m$, the relationship between the light scattering vector Ii on the incidence side and the light scattering vector Ir on the reflection side is represented by Relational Expression F1. By the way, the subscript m attached to each calculation matrix indicates the order of the layer. "1" is given to the layer located at the uppermost side (visible side). "2" is given to the layer located immediately below the layer of "1". "3" and serial numbers thereafter are given to the layers under the layer of "2".

$$Ir=RA_1*Ii+RC_1*RA_2*RB_1*Ii+RC_1*RA_2*RD_1*RA_2*RB_1*Ii+ \quad \text{Relational Expression F1}$$

In the light scattering matrix calculation described above, the combination of the conditions which are set in step S011, the second light scattering characteristic data for each ink type acquired for each density of dots, and the third light scattering characteristic data acquired for each type of the internal scattering member 4 are applied. As a result, the light scattering characteristic (specifically, BSSRDF characteristic) of each unit region is calculated. Here, the BS SRF characteristic as a calculation result is a light scattering characteristic relating to a laminated structure including the printing layer 5 formed under each formation condition and the internal scattering member 4 of the substrate 2 on which the printing layer 5 is formed. In other words, the BSSRDF characteristic obtained from the light scattering matrix calculation is the estimation result of the light scattering characteristic for each part of the printed matter 1 which is the final product.

Although it has been described above that the BSSRDF characteristic is calculated and estimated as the light scattering characteristic, the present invention is not limited to this. For example, in a case where the light scattering characteristic is represented by MTF, the MTF characteristic as the light scattering characteristic is estimated. In order to estimate the MTF characteristics, light scattering analysis calculation is performed using the combination of the conditions which are set in step S011, the second light scattering characteristic data for each ink type acquired for each density of dots, and the third light scattering characteristic data acquired for each type of the internal scattering member 4.

The light scattering analysis calculation is a calculation for obtaining the MTF characteristics of reflection relating to the laminated structure from the MTF characteristics of reflection and transmission relating to each layer for the light (incident light) incident on the laminated structure. For example, in a case where the base layer is the p layer and the number of layers above the p layer is n (n is a natural number), the MTF characteristic of reflection relating to the laminated structure consisting of n layers and the p layer is described by Expression (1).

$$R_{1,2 \ldots ,n,p} = R_1 + \frac{T_1^2 \times R_{2 \ldots ,p}}{1 - R_1 \times R_{2 \ldots n,p}} \quad (1)$$

In Expression (1), $R_i$ is the MTF characteristic of the reflection of the i-layer (i=1 to n), and $T_i$ is the MTF characteristic of the transmission of the i-layer.

Here, considering the laminated structure of two layers consisting of the n-th layer and the p layer, Expression (1) is turned into Expression (1-1).

$$R_{n,p} = R_n + \frac{T_n^2 \times R_p}{1 - R_n \times R_p} \quad (1\text{-}1)$$

As can be seen from the above equation, in a case where the MTF characteristics of the n-th layer and the p layer are obtained, the MTF characteristics of reflection relating to the laminated structure of the two layers can be described.

Further, considering the laminated structure of three layers including the n-th layer, the (n−1)th layer, and the p layer, Expression (1) is turned into Expression (1-2).

$$R_{n-1,n,p} = R_{n-1} + \frac{T_{n-1}^2 \times R_{n,p}}{1 - R_{n-1} \times R_{n,p}} \quad (1\text{-}2)$$

As can be seen from the above equation, in a case where the MTF characteristics are obtained for each of the (n−1)th layer, the n-th layer, and the p layer, the MTF characteristics of the reflection relating to the laminated structure of the three layers can be described.

Based on the above points, the MTF characteristic of reflection (that is, the MTF characteristic described by Expression (1)) relating to the laminated structure having the n layers and the p layer can be, after all, described in a case where the MTF characteristic of each of the 1st to n-th layers and the p layer is obtained.

In the light scattering analysis calculation described above, the condition contents specified for each unit region in step S011, the second light scattering characteristic data for each ink type acquired for each density of dots, and the third light scattering characteristic data acquired for each type of the internal scattering member 4 are applied. As a result, the light scattering characteristic (specifically, MTF characteristics) of each unit region are calculated. Here, the MTF characteristic as the calculation result is an estimation result of the light scattering characteristic for each part of the printed matter 1 which is the final product, as in the light scattering matrix calculation.

Specific examples of the above-mentioned light scattering analysis calculation includes, for example, calculation described in "Kubelka P (1954) New contributions to the optics of intensely light-scattering materials. Part II: Nonhomogeneous layers. J Opt Soc Am 44 (4): 330 to 335".

Then, in the light scattering characteristic estimation processing, the above series of steps, that is, steps S011 and S012 of FIG. 12 are repeated for all the combinations relating to the plurality of set formation conditions (S013). As a result, the light scattering characteristic of the printed matter 1 formed in a case where the printing layer 5 is formed under the formation condition relating to each combination can be estimated by changing the combination. Then, the correspondence relationship between the combination relating to the formation condition and the estimation result of the light scattering characteristic reproduced under the conditions relating to the combination is converted into data as a look-up table (LUT). The formation condition setting processing to be performed later refers to the LUT.

(Formation Condition Setting Processing)

The formation condition setting processing is processing of selecting one optimal combination for reproducing the texture of the surface of the target object from a plurality of combinations relating to the formation condition which is set in the above-mentioned light scattering characteristic estimation processing, and setting the formation condition relating to the combination as the formation condition actually employed at the time of forming the printing layer 5. Further, in the formation condition setting processing of the present embodiment, the formation condition employed at the time of forming the printing layer 5 is set for each unit region.

The formation condition setting processing will be described in detail. In the formation condition setting processing, the acquired first light scattering characteristic data and the thickness data are used. Further, the formation condition setting processing refers to the correspondence relationship (more precisely, refers to a look-up table indicating the correspondence relationship) between the combinations relating to the formation condition specified in the above-mentioned light scattering characteristic estimation processing and the estimation results of the light scattering characteristic reproduced under the formation condition relating to each combination.

Figure 18:
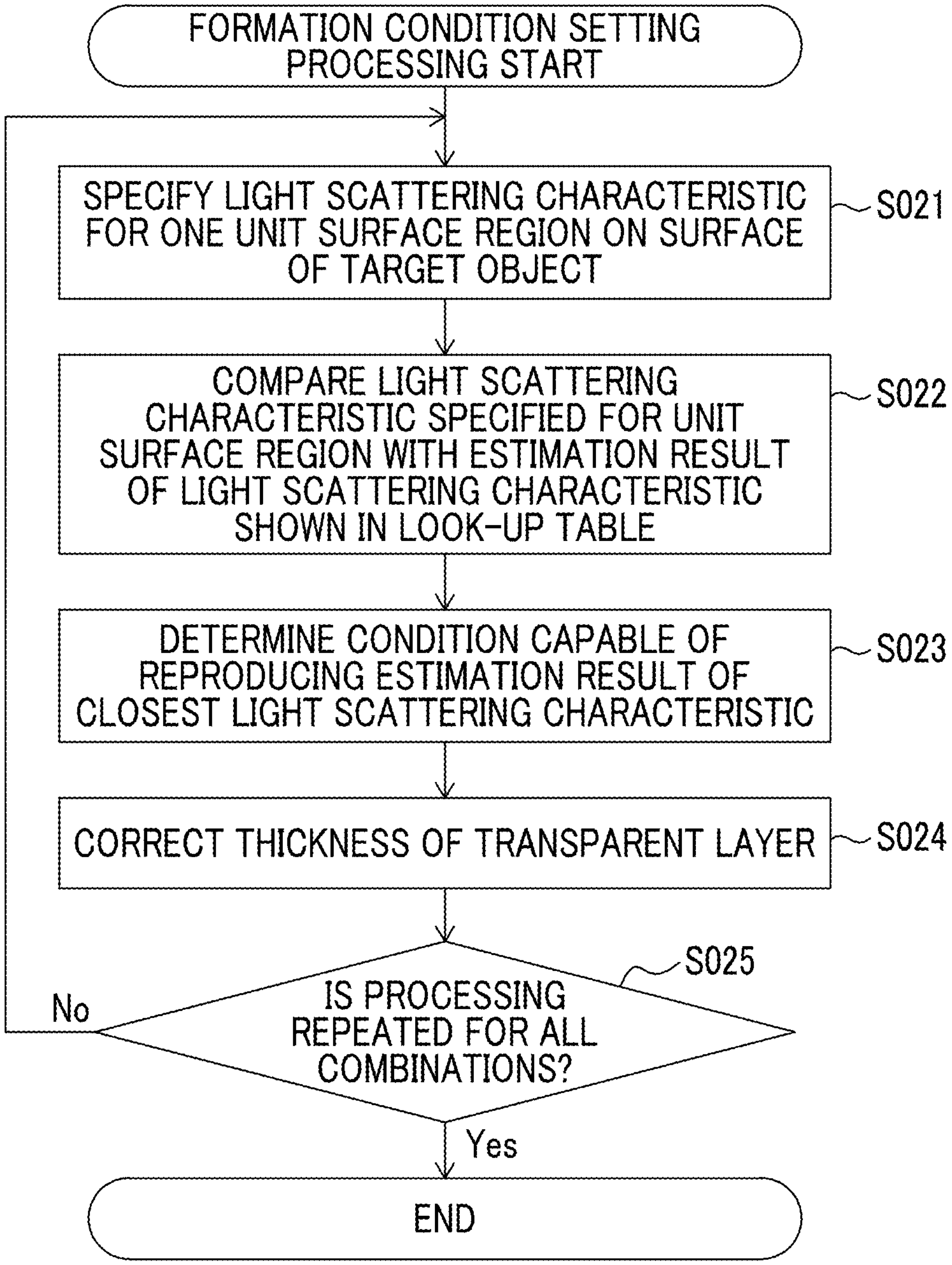
FIG. 18 is a diagram showing a flow of formation condition setting processing.

The formation condition setting processing is carried out in accordance with the flow shown in FIG. 18. Specifically, first, the light scattering characteristic indicated by the first light scattering characteristic data is specified for one unit surface region on the surface of the target object (S021). Next, the light scattering characteristic specified in step S021 is compared with the scattering result of the light scattering characteristic shown in the above look-up table (S022).

Further, in step S022, in the look-up table, the estimation result of the light scattering characteristic closest to the light scattering characteristic specified in step S021 (that is, the estimation result of the light scattering characteristic that minimizes the error between itself and the light scattering characteristic specified in step S021) is specified. Then, the combination of conditions that are able to reproduce the estimation result of the specified light scattering characteristic is determined from the above look-up table. As a result, for one unit surface region and the corresponding unit region, the optimum combination of conditions for reproducing the texture of the unit surface region is selected.

Then, based on the thickness indicated by the thickness data for one unit surface region, the thickness of the transparent layer 8 formed in the unit region corresponding to the unit surface region is corrected (S023). By correcting and determining the thickness of the transparent layer 8, the number of times the clear ink is discharged (the number of drops) to achieve the thickness is determined.

Then, in the formation condition setting processing, the above series of steps, that is, steps S021 to S023 in FIG. 18 are repeated for all of the plurality of unit surface regions on the surface of the target object. As a result, a combination of conditions suitable for reproducing the texture of the target object is selected for each unit region, and the formation condition relating to the selected combination is used for each unit region as the formation condition employed at the time of forming the printing layer 5 (S024).

(Print Data Transmission Processing)

The print data transmission processing is processing in which the print control device 50 creates print data indicating the formation condition which is set for each unit region in the formation condition setting processing, and transmits the print data to the printing layer forming device 20.

(Printing Processing)

The printing processing is processing in which the printing layer forming device 20 forms (prints) the printing layer 5 on the texture reproduction substrate 2 according to the print data. More specifically, in a case where the control mechanism 24 of the printing layer forming device 20 receives the print data, the control mechanism 24 controls the moving mechanism 21, the discharge mechanism 22, and the curing mechanism 23 in accordance with the print data. Specifically, the control mechanism 24 conveys the substrate 2 having the internal scattering member 4 of the type indicated by the print data to the moving mechanism 21.

Further, the control mechanism 24 controls each unit of the printing layer forming device 20 so that the printing layer 5 is formed on the printing surface (that is, on the surface of the internal scattering member 4) in accordance with the formation conditions indicated by the print data. At this time, the control mechanism 24 controls each unit of the printing layer forming device 20 so that each part of the printing layer 5 is formed in accordance with the formation condition which is set for the unit region corresponding to each part. As a result, each part of the printing layer 5 is formed in an image-wise (image-like) manner in accordance with the position of each part.

More specifically, a color layer 6 is formed in each part of the printing layer 5. That is, the color ink of each YMCK color is discharged to each unit region on the printing surface in accordance with the formation condition which is set for each unit region. As a result, a color layer 6 of each YMCK color is formed in each unit region at a set density (concentration) of dots.

Further, in a case where the target object has a transparent part, the printing layer 5 having the transparent layer 8 is formed in the part corresponding to the transparent part. That is, the clear ink is discharged to the unit region of the printing layer 5 where the part having the transparent layer 8 is formed in accordance with the formation condition which is set for the unit region. As a result, the transparent layer 8 having the set thickness is formed in the above unit region.

Further, in a case of forming the printing layer 5 having a multilayer structure in at least a part thereof, the printing layer 5 having the white layer 7 is formed in the part having the multilayer structure. That is, white ink is discharged to the unit region of the printing layer 5 on which the part having the multilayer structure is formed in accordance with the formation condition which is set for the unit region. As a result, the white layer 7 is formed in the above unit region at the set density (concentration) of dots. In such a case, the printing layer 5 is further formed so that the color layer 6 is disposed on the side opposite to the internal scattering member 4 through the white layer 7 in the part having the multilayer structure.

Further, in a case of forming the printing layer 5 in which the part corresponding to the transparent part has a multilayer structure, the printing layer 5, in which the white layer 7 is disposed between the transparent layer 8 and the internal scattering member 4 in the multilayer structure, is formed. In such a case, in the part having the above-mentioned multilayer structure (in other words, the part corresponding to the transparent part), the printing layer 5 is formed such that the color layer 6 is disposed adjacent to the transparent layer 8 between the transparent layer 8 and the internal scattering member 4.

Furthermore, in the above-mentioned part having the multilayer structure, the printing layer 5 may be formed so that the low brightness layer 9 is disposed adjacent to the color layer 6 between the color layer 6 and the internal scattering member 4. In such a case, gray ink is discharged to the unit region where the low brightness layer 9 is formed in accordance with the formation condition which is set for the unit region. As a result, a gray low brightness layer 9 is formed in the above-mentioned unit region at a set density (concentration) of dots.

Then, at the end of the printing processing, the formation of the printing layer 5 on the printing surface of the substrate 2 is completed, and the printed matter 1 which is the final product is formed. Then, the surface of the formed printed matter 1 (the surface on the visible side) is a surface on which the texture of the surface of the target object is satisfactorily reproduced.

About Effectiveness of Present Embodiment

As described above, in the present embodiment, it is possible to form the printed matter 1 in which the texture of the target object is satisfactorily reproduced. In this respect, the present embodiment is more effective than the techniques described in each of JP2018-12242A and JP2016-196103A exemplified as the prior art.

More specifically, as described in the section "Problems to be Solved by the Invention", in the techniques described in JP2018-12242A and JP2016-196103A, the formation condition of the printing layer 5 (ink layer) is determined based on the light scattering characteristic of the target object. However, the light scattering characteristic of the printed matter 1 finally obtained is affected by not only the layer configuration of the printing layer 5 (specifically, the type of ink constituting each layer, the thickness of each layer, and the like), but also the optical properties of the substrate 2 on which the printing layer 5 is formed. In particular, in a case where the internal scattering member 4 is used as the constituent material of the substrate 2, the influence of the internal scattering member 4 on the light scattering characteristic of the printed matter 1 becomes remarkable.

Therefore, in order to reproduce the texture of the target object satisfactorily, it is necessary to estimate (predict) the optical characteristics of the printed matter 1 from the characteristics of the substrate 2 and the printing layer 5 formed on the substrate 2, and set the formation condition of the printing layer 5 in accordance with the estimation result. However, in the above-mentioned JP2018-12242A and JP2016-196103A, the optical characteristics of the substrate 2 and the like are not taken into consideration in a case of setting the formation condition of the printing layer 5.

On the other hand, in the present embodiment, data indicating light scattering characteristic for each of the target object, the ink used, and the internal scattering member 4 (that is, first light scattering characteristic data, second light scattering characteristic data, and third light scattering characteristic data) is acquired, and the light scattering characteristic of the printed matter 1 is estimated based on these data. Then, the formation condition of the printing layer 5 is set based on the estimation result of the light scattering characteristics. As a result, in the present embodiment, it is possible to produce a printed matter 1 in which the texture of the target object is more satisfactorily reproduced as compared with the techniques described in each of JP2018-12242A and JP2016-196103A.

Other Embodiments

Although the printed matter forming method and the printed matter forming system according to an embodiment of the present invention have been described above with an example, the above-mentioned embodiment is merely an example, and other examples are also conceivable.

More specifically, in the above embodiment, the light scattering characteristic and the sense of depth of the transparent part are reproduced by printing as the texture of the target object. However, the present invention is not limited to this, and at least the light scattering characteristic may be reproduced by printing, and for example, the sense of depth may not be included in the reproduction target. Alternatively, a texture other than the light scattering characteristic and the sense of depth may be added to the texture to be reproduced.

The layer configuration of the printing layer 5 is not limited to the structure shown in FIG. 3. For example, the arrangement order of the color layer 6, the white layer 7, the transparent layer 8, and the low brightness layer 9 may be different from that in FIG. 3. Further, an ink layer other than the above four types of layers may be newly added to the above layer configuration, or may be formed in place of any one of the above four types of layers.

Further, in the above embodiment, the apparatus for forming the printing layer 5 for producing the printed matter 1 (that is, the printing layer forming device 20) is a digital printing type printing apparatus such as a printer, but the present invention is not limited thereto. The printing layer forming device 20 may be an analog printing type printing apparatus, for example, an offset printing machine. That is, the present invention can be applied not only to the digital printing technique but also to the analog printing technique.

EXPLANATION OF REFERENCES

1: printed matter
1*a*, 1*b*, 1*c*, 1*d*: portion
2: substrate
3: white medium
4: internal scattering member
5: printing layer
6: color layer
7: white layer
8: transparent layer
9: low brightness layer
10: printed matter forming system
20: printing layer forming device
21: moving mechanism
21R: movement path
22: discharge mechanism
22S: nozzle surface
23: curing mechanism
24: control mechanism
30: thickness data acquisition device
40: light scattering characteristic data acquisition device
50: print control device
Ix, Iy: light
LP: square wave chart
LPx: rectangular pattern
M: layer
Nc, Ng, Nh, Nk, Nm, Nw, Ny: nozzle line
R: calculation matrix
SP1, SP2, SP3, SP4, SP5, SP6: sample pattern
T: granite
Tc: quartz

What is claimed is:

1. A printed matter forming method of forming a printed matter by forming a printing layer on a surface of an internal scattering member in order to reproduce a texture of a surface of a target object, the printed matter forming method comprising:

acquiring first light scattering characteristic data about a light scattering characteristic of the target object with respect to incident light on the surface of the target object;

acquiring second light scattering characteristic data about a light scattering characteristic of a fluid constituting the printing layer, for each type of the fluid;

acquiring third light scattering characteristic data about a light scattering characteristic of the internal scattering member;

estimating a light scattering characteristic of the printed matter according to a formation condition of the printing layer, based on the second light scattering characteristic data for each type of the fluid and the third light scattering characteristic data;

setting the formation condition employed at the time of forming the printing layer, based on the estimated light scattering characteristic of the printed matter and the first light scattering characteristic data; and forming the printing layer on the surface of the internal scattering member in accordance with the set formation condition.

2. The printed matter forming method according to claim 1, wherein in a case of acquiring the second light scattering characteristic data for each type of the fluid, a density of dots formed by landing of the fluid is changed, and the second light scattering characteristic data is acquired for each density; and in a case of estimating the light scattering characteristic of the printing layer, the light scattering characteristic of the printed matter is estimated, based on the second light scattering characteristic data and the third light scattering characteristic data for each type of the fluid acquired for each density.

3. The printed matter forming method according to claim 2, wherein the formation condition includes a condition relating to at least one of the number of layers of the printing layer, a thickness of the layer, a type of the fluid constituting the layer, or the density of the dots in the layer.

4. The printed matter forming method according to claim 2, wherein in a case of setting the formation condition employed at the time of forming the printing layer, a formation area of the printing layer on the surface of the internal scattering member is divided into a plurality of unit regions, and the formation condition employed at the time of forming the printing layer is set for each unit region; and in a case of forming the printing layer, each part of the printing layer is formed in accordance with the formation condition which is set for the unit region corresponding to each part.

5. The printed matter forming method according to claim 2, wherein thickness data about a thickness of a transparent part exposed on the surface of the target object is further acquired; and in a case of setting the formation condition employed at the time of forming the printing layer, the formation condition is set based on the estimated light scattering characteristic of the printed matter, the thickness data, and the first light scattering characteristic data.

6. The printed matter forming method according to claim 5, wherein in a case of forming the printing layer, the printing layer having a transparent layer composed of a transparent fluid in a part corresponding to the transparent part is formed.

7. The printed matter forming method according to claim 6, wherein in a case of forming the printing layer having a multilayer structure in at least a part thereof, the printing layer having a white layer composed of a white fluid in the multilayer structure is formed.

8. The printed matter forming method according to claim 7, wherein in a case of forming the printing layer having a multilayer structure in the part corresponding to the transparent part, the printing layer in which the white layer is disposed between the transparent layer and the internal scattering member in the multilayer structure is formed.

9. The printed matter forming method according to claim 7, wherein in a case of forming the printing layer having the multilayer structure in at least a part thereof, the printing layer having the white layer and a color layer disposed on an opposite side of the internal scattering member with the white layer interposed therebetween in the part of the multilayer structure is formed.

10. The printed matter forming method according to claim 6, wherein in a case of forming the printing layer having a multilayer structure in the part corresponding to the transparent part, the printing layer having the transparent layer and a color layer disposed adjacent to the transparent layer between the transparent layer and the internal scattering member in the part corresponding to the transparent part is formed.

11. The printed matter forming method according to claim 1, wherein in a case of setting the formation condition employed at the time of forming the printing layer, a formation area of the printing layer on the surface of the internal scattering member is divided into a plurality of unit regions, and the formation condition employed at the time of forming the printing layer is set for each unit region; and in a case of forming the printing layer, each part of the printing layer is formed in accordance with the formation condition which is set for the unit region corresponding to each part.

12. The printed matter forming method according to claim 1, wherein thickness data about a thickness of a transparent part exposed on the surface of the target object is further acquired; and in a case of setting the formation condition employed at the time of forming the printing layer, the formation condition is set based on the estimated light scattering characteristic of the printed matter, the thickness data, and the first light scattering characteristic data.

13. The printed matter forming method according to claim 12, wherein in a case of forming the printing layer, the printing layer having a transparent layer composed of a transparent fluid in a part corresponding to the transparent part is formed.

14. The printed matter forming method according to claim 13, wherein in a case of forming the printing layer having a multilayer structure in at least a part thereof, the printing layer having a white layer composed of a white fluid in the multilayer structure is formed.

15. The printed matter forming method according to claim 14, wherein in a case of forming the printing layer having a multilayer structure in the part corresponding to the transparent part, the printing layer in which the white layer is disposed between the transparent layer and the internal scattering member in the multilayer structure is formed.

16. The printed matter forming method according to claim 14, wherein in a case of forming the printing layer having the multilayer structure in at least a part thereof, the printing layer having the white layer and a color layer disposed on an opposite side of the internal scattering member with the white layer interposed therebetween in the part of the multilayer structure is formed.

17. The printed matter forming method according to claim 13, wherein in a case of forming the printing layer having a multilayer structure in the part corresponding to the transparent part, the printing layer having the transparent layer and a color layer disposed adjacent to the transparent layer between the transparent layer and the internal scattering member in the part corresponding to the transparent part is formed.

18. The printed matter forming method according to claim 17, wherein in a case of forming the printing layer having the color layer in a part of the multilayer structure, the printing layer, in which a low brightness layer disposed adjacent to the color layer between the color layer and the internal scattering member is provided in a part of the multilayer structure, is formed, and the low brightness layer is a layer having a color of which a brightness is lower than that of white.

19. The printed matter forming method according to claim 1, wherein the light scattering characteristics of the target object, the internal scattering member, and the fluid are characteristics represented by a modulation transfer function or a bidirectional scattering surface reflectance distribution function.

20. A printed matter forming system that forms a printed matter by forming a printing layer on a surface of an internal scattering member in order to reproduce a texture of a surface of a target object, the printed matter forming system comprising:

a light scattering characteristic data acquisition device that acquires data about light scattering characteristics;

a printing layer forming device that forms the printing layer on the surface of the internal scattering member; and a print control device that forms the printing layer on the printing layer forming device, wherein the light scattering characteristic data acquisition device acquires first light scattering characteristic data about the light scattering characteristic of the target object with respect to incident light on the surface of the target object, the light scattering characteristic data acquisition device acquires second light scattering characteristic data about a light scattering characteristic of a fluid constituting the printing layer, for each type of the fluid, the light scattering characteristic data acquisition device further acquires third light scattering characteristic data about a light scattering characteristic of the internal scattering member, the print control device estimates the light scattering characteristic of the printed matter corresponding to the formation condition of the printing layer, based on the second light scattering characteristic data and the third light scattering characteristic data for each type of the fluid, and then sets the formation condition employed at the time of forming the printing layer, based on the estimated light scattering characteristic of the printed matter and the first light scattering characteristic data, and the printing layer forming device forms the printing layer on the surface of the internal scattering member in accordance with the formation condition which is set by the print control device.

* * * * *